US012786469B2

(12) United States Patent
Van der Auwera et al.

(10) Patent No.: US 12,786,469 B2
(45) **Date of Patent: *Nov. 3, 2026**

(54) V-DMC DISPLACEMENT WAVELET COEFFICIENT INTER PREDICTION WITH FIXED-POINT QUANTIZATION

(71) Applicant: QUALCOMM Incorporated, San Diego, CA (US)

(72) Inventors: Geert Van der Auwera, San Diego, CA (US); Adarsh Krishnan Ramasubramonian, Irvine, CA (US); Reetu Hooda, San Diego, CA (US); Anique Akhtar, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/013,855

(22) Filed: Jan. 8, 2025

(65) Prior Publication Data

US 2025/0234036 A1 Jul. 17, 2025

Related U.S. Application Data

(60) Provisional application No. 63/620,665, filed on Jan. 12, 2024.

(51) Int. Cl.
*H04N 19/70* (2014.01)
*H04N 19/124* (2014.01)
(Continued)

(52) U.S. Cl.
CPC ......... *H04N 19/597* (2014.11); *H04N 19/124* (2014.11); *H04N 19/61* (2014.11); *H04N 19/70* (2014.11)

(58) Field of Classification Search
CPC .... H04N 19/124; H04N 19/70; H04N 19/597; H04N 19/61
See application file for complete search history.

(56) References Cited

U.S. PATENT DOCUMENTS

2017/0085879 A1* 3/2017 Minoo ...................... G06T 5/90
2021/0385485 A1* 12/2021 Liao ..................... H04N 19/105
(Continued)

OTHER PUBLICATIONS

Auwera G.V.D (Qualcomm)., et al., "[V-DMC] [EE4.7 Test5-related] V-DMC Displacement Wavelet Coefficient Inter Prediction with Fixed-Point Quantization", International Organisation for Standardisation Organisation Internationale De Normalisation ISO/IEC JTC 1/SC 29/WG 7 Coding of Moving Pictures and Audio, ISO/IEC JTC 1/SC 29/WG 7, No. m66302, Online—Jan. 2024, Jan. 17, 2024, 9 Pages, XP030315656, section 2 Proposal, figures 3(b), 4(b).
(Continued)

*Primary Examiner* — Tsion B Owens
(74) *Attorney, Agent, or Firm* — QUALCOMM Incorporated; Espartaco Diaz Hidalgo

(57) ABSTRACT

A device for decoding encoded dynamic mesh data can be configured to determine a set of quantized integer coefficient values for displacement vectors of the encoded dynamic mesh data; inverse quantize the set of quantized integer coefficient values to determine a set of fixed-point dequantized coefficient values; determine a set of fixed-point transformed coefficient values based on the set of fixed-point dequantized coefficient values; convert the set of fixed-point transformed coefficient values to a set of floating-point transformed coefficient values; inverse transform the set of floating-point transformed coefficient values to determine a set of reconstructed displacement vectors; and determine a reconstructed deformed mesh based on the set of reconstructed displacement vectors.

20 Claims, 17 Drawing Sheets

(51) Int. Cl.
*H04N 19/597* (2014.01)
*H04N 19/61* (2014.01)

(56) References Cited

U.S. PATENT DOCUMENTS

| | | | | |
|---|---|---|---|---|
| 2024/0430471 | A1* | 12/2024 | Tian | H04N 19/124 |
| 2025/0022180 | A1* | 1/2025 | Tian | G06T 9/004 |
| 2025/0022181 | A1* | 1/2025 | Tian | G06T 9/001 |
| 2025/0124655 | A1* | 4/2025 | Cao | G06T 17/20 |
| 2025/0310566 | A1* | 10/2025 | Ohkawa | H04N 19/597 |
| 2026/0017831 | A1* | 1/2026 | Zakharchenko | G06T 9/001 |
| 2026/0030789 | A1* | 1/2026 | Nishi | G06T 9/001 |

OTHER PUBLICATIONS

Auwera G.V.D (Qualcomm)., et al., "[V-DMC][EE4.16] Test 1 Results", International Organisation for Standardisation Organisation Internationale De Normalisation ISO/IEC JTC 1/SC 29/WG 7 Coding of Moving Pictures and Audio, ISO/IEC JTC 1/SC 29/WVG 7, m65565 Hannover—Oct. 2023, MPEG Meeting, Oct. 16, 2023-Oct. 20, 2023, Oct. 16, 2023, 8 pages, XP030313240, abstract, figure 1 p. 1-p. 3.

Gao W (Tencent)., et al., "[V-DMC][New] On implementation of vmesh codec", International Organisation for Standardisation Organisation Internationale De Normalisation ISO/IEC JTC 1/SC 29/WG 7 Coding of Moving Pictures and Audio, ISO/IEC JTC 1/SC 29/WG 7, Antalya, Tiirkiye—Apr. 2023, MPEG Meeting, Apr. 24, 2023-Apr. 28, 2023, Antalya, Motion Picture Expert Group or ISO/IEC JTC1/SC29/WG11), No. m63320, Apr. 27, 2023, XP030310434, 9 pages, section 2 Problem, figure 1 section 3.2 Dequantization of quantized wavelet coefficients.

International Search Report and Written Opinion—PCT/US2025/010913—ISA/EPO—Apr. 28, 2025 15 Pages.

Nishimura H (KDDI)., et al., "[V-DMC][EE4.7 Test 5.1] Quantization after Inter Prediction in Arithmetic Coding-based Displacement Coding", International Organisation for Standardisation Organisation Internationale De Normalisation ISO/IEC JTC 1/SC 29/WG 7 Coding of Moving Pictures and Audio, ISO/IEC JTC 1/SC 29/WG 7m m64391 Jeneva—Jul. 2023, MPEG Meeting, Jul. 17, 2023-Jul. 21, 2023, Geneva, (Motion Picture Expert Group or ISO/IEC JTC1/SC29/WG11), No. m64391, Jul. 18, 2023, XP030325289, 8 pages, abstract, figure 1.

Sugio T (Panasonic): "[V-DMC] [EE4.7-related] [New] LoD Based Inter Prediction for Displacement Vector Coding", International Organisation for Standardisation Organisation Internationale De Normalisation ISO/IEC JTC 1/ SC 29/WG 7 Coding of Moving Pictures and Audio, ISO/IEC JTC 1/SC 29/WG 7, Hannover, Germany—Oct. 2023, 6 pgaes, MPEG Meeting, Oct. 16, 2023-Oct. 20, 2023, Hannover, (Motion Picture Expert Group or ISO/IEC JTC1/SC29/ WG11), No. m65426, Oct. 11, 2023, XP030313023, abstract, figures 3,4.

Calderbank A.R., et al., "Wavelet Transforms That Map Integers to Integers," Applied and Computational Harmonic Analysis 5, Article No. HA970238, 1998, pp. 332-369.

Fusell D., "Subdivision curves," University of Texas at Austin, 2010, pp. 1-20.

Garland M., et al., "Surface Simplification Using Quadric Error Metrics," Proceedings of the 24th annual conference on Computer Graphics and Interactive Techniques, Aug. 3, 1997, 8 Pages.

International Standard: "Information Technology—Coded Representation of Immersive Media—Part 9: Geometry-Based Point Cloud Compression," ISO/IEC FDIS 23090-9, Final Draft, 2022, 14 Pages.

Kolarov K., et al., "Wavelet Compression for 3D and Higher Dimensional Objects," SPIE Conference on Applications of Digital Image Processing, vol. 3164, San Diego, 1997, pp. 1-13.

Rossignac J., et al., "3D Compression Made Simple: Edgebreaker on a Corner-Table," College of Computing and GVU Center, Jan. 2001, 7 Pages.

Rossignac J., et al., "Edgebreaker: A Simple Compression for Surfaces with Handles," Proceedings of the seventh ACM Symposium on Solid Modeling and Applications, Published on Jun. 17, 2002, 12 Pages.

Sweldens W., et al., "Building Your Own Wavelets at Home," Morning Section: Introductory Material, Publication Oct. 20, 2005, 1996, 75 Pages.

* cited by examiner b(i) – Compressed Bitstream
A''(i) – Decoded Attribute Map
M''(i) – Decoded Mesh
m''(i) – Decoded Base Mesh
d''(i) – Decoded Displacements

V-DMC DISPLACEMENT WAVELET COEFFICIENT INTER PREDICTION WITH FIXED-POINT QUANTIZATION

This application claims the benefit of U.S. Provisional Patent Application No. 63/620,665, filed 12 Jan. 2024, the entire contents of which is incorporated herein by reference.

TECHNICAL FIELD

This disclosure relates to video-based coding of dynamic meshes.

BACKGROUND

Meshes may be used to represent physical content of a 3-dimensional space. Meshes have utility in a wide variety of situations. For example, meshes may be used in the context of representing the physical content of an environment for purposes of positioning virtual objects in an extended reality, e.g., augmented reality (AR), virtual reality (VR), or mixed reality (MR), application. Mesh compression is a process for encoding and decoding meshes. Encoding meshes may reduce the amount of data required for storage and transmission of the meshes.

SUMMARY

To determine displacement vectors, a mesh decoder may perform inter prediction on wavelet coefficients after inverse quantization, as described in more detail below. The mesh decoder adds the inverse quantized coefficients (residuals) to inter predicted values that are stored in a frame buffer. A benefit of this technique is that the correlation between wavelet coefficients of adjacent frames is typically greater than the correlation between the corresponding quantized coefficients, which results in additional coding efficiency gains. However, the inverse quantization process is implemented as floating point operations, which are known to produce results that are operation order and platform implementation dependent. Because the reconstructed wavelet coefficients are stored in the frame buffer for inter prediction, the floating-point operations may result in different reconstructed wavelet coefficients at the encoder and decoder if the implementations differ.

To address this issue, the techniques of the present disclosure include converting a set of fixed-point transformed coefficient values to a set of floating-point transformed coefficient values and inverse transforming the set of floating-point transformed coefficient values to determine a set of reconstructed displacement vectors. To address this issue, the techniques of the present disclosure additionally include storing the set of fixed-point transformed coefficient values in a reference buffer. By configuring mesh encoders and decoders in this manner, the techniques of this disclosure may improve the overall quality of decoded mesh data. A base mesh encoder is configured to make encoding decisions based on the properties of the decoded mesh. Thus, to achieve a consistently desirable rate-distortion tradeoff, a base mesh encoder needs to be able to accurately determine all the properties of a decoded mesh. The techniques of this disclosure reduce or remove discrepancies between the encoding and decoding processes, and thus, improves the overall quality of encoding and decoding.

According to an example of this disclosure, a device for decoding encoded dynamic mesh data includes one or more memories; and one or more processors, implemented in circuitry and in communication with the one or more memories, configured to: determine a set of quantized integer coefficient values for displacement vectors of the encoded dynamic mesh data; inverse quantize the set of quantized integer coefficient values to determine a set of fixed-point dequantized coefficient values; determine a set of fixed-point transformed coefficient values based on the set of fixed-point dequantized coefficient values; convert the set of fixed-point transformed coefficient values to a set of floating-point transformed coefficient values; inverse transform the set of floating-point transformed coefficient values to determine a set of reconstructed displacement vectors; and determine a reconstructed deformed mesh based on the set of reconstructed displacement vectors.

According to an example of this disclosure, a method for decoding encoded dynamic mesh data, the method comprising: determining a set of quantized integer coefficient values for displacement vectors of the encoded dynamic mesh data; inverse quantizing the set of quantized integer coefficient values to determine a set of fixed-point dequantized coefficient values; determining a set of fixed-point transformed coefficient values based on the set of fixed-point dequantized coefficient values; converting the set of fixed-point transformed coefficient values to a set of floating-point transformed coefficient values; inverse transforming the set of floating-point transformed coefficient values to determine a set of reconstructed displacement vectors and determining a reconstructed deformed mesh based on the set of reconstructed displacement vectors.

According to an example of this disclosure, a computer-readable storage medium storing instructions that when executed by one or more processors cause the one or more processors to: determine a set of quantized integer coefficient values for displacement vectors of the encoded dynamic mesh data; inverse quantize the set of quantized integer coefficient values to determine a set of fixed-point dequantized coefficient values; determine a set of fixed-point transformed coefficient values based on the set of fixed-point dequantized coefficient values; convert the set of fixed-point transformed coefficient values to a set of floating-point transformed coefficient values; inverse transform the set of floating-point transformed coefficient values to determine a set of reconstructed displacement vectors; and determine a reconstructed deformed mesh based on the set of reconstructed displacement vectors.

According to an example of this disclosure, a device for encoding dynamic mesh data includes one or more memories; and one or more processors, implemented in circuitry and in communication with the one or more memories, configured to: determine a set of quantized integer coefficient values; inverse quantize the set of quantized integer coefficient values to determine a set of fixed-point dequantized coefficient values; determine a set of fixed-point transformed coefficient values based on the set of fixed-point dequantized coefficient values; convert the set of fixed-point transformed coefficient values to a set of floating-point transformed coefficient values; and inverse transform the set of floating-point transformed coefficient values to determine a set of reconstructed displacement vectors.

The details of one or more examples are set forth in the accompanying drawings and the description below. Other features, objects, and advantages will be apparent from the description, drawings, and claims.

DETAILED DESCRIPTION

Figure 1:
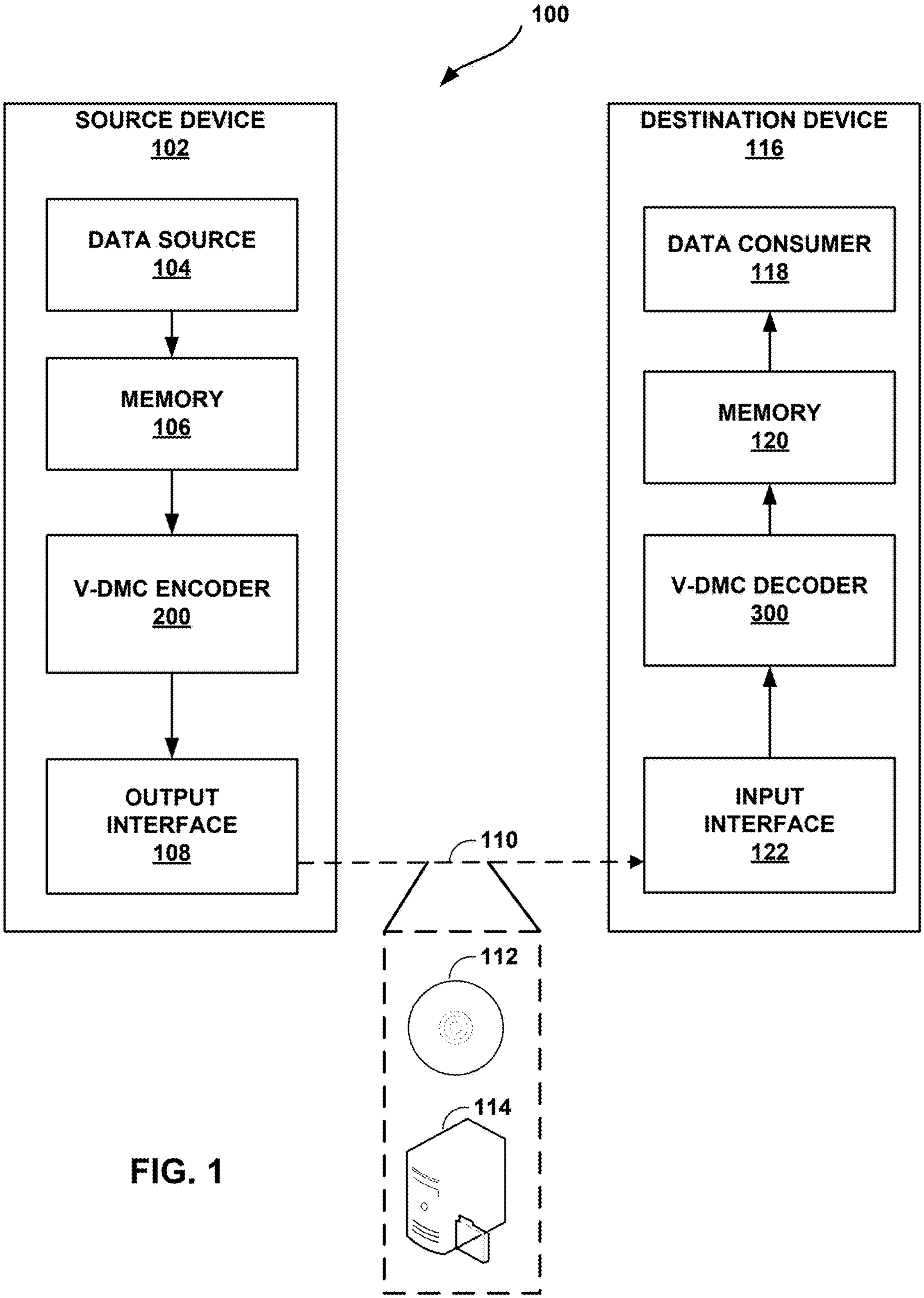
FIG. 1 is a block diagram illustrating an example encoding and decoding system that may perform the techniques of this disclosure.

A mesh generally refers to a collection of vertices in a three-dimensional (3D) space that collectively represent one or multiple objects in the 3D space. The vertices are connected by edges, and the edges form polygons, which form faces of the mesh. Each vertex may also have one or more associated attributes, such as a texture or a color. In most scenarios, having more vertices produces higher quality, e.g., more detailed and more realistic, meshes. Having more vertices, however, also requires more data to represent the mesh.

To reduce the amount of data needed to represent the mesh, the mesh may be encoded using lossy or lossless encoding. In lossless encoding, the decoded version of the encoded mesh exactly matches the original mesh. In lossy encoding, by contrast, the process of encoding and decoding the mesh causes loss, such as distortion, in the decoded version of the encoded mesh.

In one example of a lossy encoding technique for meshes, a mesh encoder decimates an original mesh to determine a base mesh. To decimate the original mesh, the mesh encoder subsamples or otherwise reduces the number of vertices in the original mesh, such that the base mesh is a rough approximation, with fewer vertices, of the original mesh. The mesh encoder then subdivides the decimated mesh. That is the mesh encoder estimates the locations of additional vertices in between the vertices of the base mesh. The mesh encoder then deforms the subdivided mesh by moving the vertices in a manner that makes the deformed mesh more closely match the original mesh.

After determining a desired base mesh and deformation of the subdivided mesh, the mesh encoder generates a bitstream that includes data for constructing the base mesh and data for performing the deformation. The data defining the deformation may be signaled as a series of displacement vectors that indicate the movement, or displacement, of the additional vertices determined by the subdividing process. To decode a mesh from the bitstream, a mesh decoder reconstructs the base mesh based on the signaled information, applies the same subdivision process as the mesh encoder, and then displaces the additional vertices based on the signaled displacement vectors.

This disclosure relates to encoding and decoding base mesh data. More specifically, this disclosure describes various improvements to displacement vector inter prediction processes in the V-DMC technology, which is being standardized in MPEG WG7 (3DGH). This disclosure describes techniques for implementing a fixed-point (integer) quantization process in an inter prediction schemes for displacement vector coding.

To determine displacement vectors, a mesh decoder may perform inter prediction on wavelet coefficients after inverse quantization, as described in more detail below. The mesh decoder adds the inverse quantized coefficients (residuals) to inter predicted values that are stored in a frame buffer. A benefit of this technique is that the correlation between wavelet coefficients of adjacent frames is typically greater than the correlation between the corresponding quantized coefficients, which results in additional coding efficiency gains. However, the inverse quantization process is implemented as floating point operations, which are known to produce results that are operation order and platform implementation dependent. Because the reconstructed wavelet coefficients are stored in the frame buffer for inter prediction, the floating-point operations may result in different reconstructed wavelet coefficients at the encoder and decoder if the implementations differ.

To address this issue, the techniques of the present disclosure include converting a set of fixed-point transformed coefficient values to a set of floating-point transformed coefficient values and inverse transforming the set of floating-point transformed coefficient values to determine a set of reconstructed displacement vectors. To address this issue, the techniques of the present disclosure additionally include storing the set of fixed-point transformed coefficient values in a reference buffer. By configuring mesh encoders and decoders in this manner, the techniques of this disclosure may improve the overall quality of decoded mesh data. A base mesh encoder is configured to make encoding decisions based on the properties of the decoded mesh. Thus, to achieve a consistently desirable rate-distortion tradeoff, a base mesh encoder needs to be able to accurately determine all the properties of a decoded mesh. The techniques of this disclosure reduce or remove discrepancies between the encoding and decoding processes, and thus, improves the overall quality of encoding and decoding.

FIG. 1 is a block diagram illustrating an example encoding and decoding system 100 that may perform the techniques of this disclosure. The techniques of this disclosure are generally directed to coding (encoding and/or decoding) meshes. The coding may be effective in compressing and/or decompressing data of the meshes.

As shown in FIG. 1, system 100 includes a source device 102 and a destination device 116. Source device 102 provides encoded data to be decoded by a destination device 116. Particularly, in the example of FIG. 1, source device 102 provides the data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a V-DMC encoder 200, and an output interface 108. Destination device 116 includes an input interface 122, a V-DMC decoder 300, a memory 120, and a data consumer 118. In accordance with this disclosure, V-DMC encoder 200 of source device 102 and V-DMC decoder 300 of destination device 116 may be configured to apply the techniques of this disclosure related to displacement vector quantization. Thus, source device 102 represents an example of an encoding device, while destination device 116 represents an example of a decoding device. In other examples, source device 102 and destination device 116 may include other components or arrangements. For example, source device 102 may receive data from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to displacement vector quantization. Source device 102 and destination device 116 are merely examples of such devices in which source device 102 generates coded data for transmission to destination device 116. This disclosure refers to a "coding" device as a device that performs coding (encoding and/or decoding) of data. Thus, V-DMC encoder 200 and V-DMC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded data) and may provide a sequential series of "frames") of the data to V-DMC encoder 200, which encodes data for the frames. Data source 104 of source device 102 may include a mesh capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, mesh data may be computer-generated from scanner, camera, sensor or other data. For example, data source 104 may generate computer graphics-based data as the source data, or produce a combination of live data, archived data, and computer-generated data. In each case, V-DMC encoder 200 encodes the captured, pre-captured, or computer-generated data. V-DMC encoder 200 may rearrange the frames from the received order (sometimes referred to as "display order") into a coding order for coding. V-DMC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from V-DMC decoder 300. Additionally or alternatively, memory 106 and memory 120 may store software instructions executable by, e.g., V-DMC encoder 200 and V-DMC decoder 300, respectively. Although memory 106 and memory 120 are shown separately from V-DMC encoder 200 and V-DMC decoder 300 in this example, it should be understood that V-DMC encoder 200 and V-DMC decoder 300 may also include internal memories for functionally similar or equivalent purposes. Furthermore, memory 106 and memory 120 may store encoded data, e.g., output from V-DMC encoder 200 and input to V-DMC decoder 300. In some examples, portions of memory 106 and memory 120 may be allocated as one or more buffers, e.g., to store raw, decoded, and/or encoded data. For instance, memory 106 and memory 120 may store data representing a mesh.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to V-DMC encoder 200 and/or output interface 108, and destination device 116 may include an SoC device to perform the functionality attributed to V-DMC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by V-DMC encoder 200, which is also used by V-DMC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on meshes.

V-DMC encoder 200 and V-DMC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of V-DMC encoder 200 and V-DMC decoder 300 may be included in one or more encoders or decoders, either of which may be integrated as part of a combined encoder/decoder (CODEC) in a respective device. A device including V-DMC encoder 200 and/or V-DMC decoder 300 may comprise one or more integrated circuits, microprocessors, and/or other types of devices.

V-DMC encoder 200 and V-DMC decoder 300 may operate according to a coding standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, V-DMC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure describes techniques that may provide various improvements in the vertex attribute encoding for base meshes in the video-based coding of dynamic meshes (V-DMC), which is being standardized in MPEG WG7 (3DGH). In V-DMC, the base mesh connectivity is encoded using an edgebreaker implementation, and the base mesh attributes can be encoded using residual encoding with attribute prediction. This disclosure describes techniques to implement a transform and/or quantization on the attribute and/or the predictions and/or the residuals for the base mesh encoding, which may improve the coding performance of the base mesh encoding.

Working Group 7 (WG7), often referred to as the 3D Graphics and Haptics Coding Group (3DGH), is presently engaged in standardizing the video-based dynamic mesh coding (V-DMC) for XR applications. The current testing model includes preprocessing input meshes into simplified versions called "base meshes." These base meshes, often contain fewer vertices than the original mesh, are encoded using a base mesh coder also called a static mesh coder. The preprocessing also generates displacement vectors as well as a texture attribute map that are both encoded using a video encoder. If the mesh is encoded in a lossless manner, then the base mesh is no longer a simplified version and is used to encode the original mesh.

The base mesh encoder encodes the connectivity of the mesh as well as the attributes associated with each vertex which typically involves the position and a coordinate for the texture but are not limited to these attributes. The position includes 3D coordinates (x,y,z) of the vertex while, the texture is stored as a 2D UV coordinate (u,v) that points to a texture map image pixel location. The base mesh in V-DMC is encoded using an edgebreaker algorithm, while the connectivity is encoded using a CLERS op code. The residual of the attribute is encoded using prediction from the previously encoded/decoded vertices. Other types of static mesh coders, such as Google Draco, may also be used. Other types of coding may also be used for the connectivity coding and residual coding.

The edgebreaker algorithm is described in Jean-Eudes Marvie, Olivier Mocquard, [V-DMC] [EE4.4] An efficient Edgebreaker implementation, ISO/IEC JTC1/SC29/WG7, m63344, April 2023 (hereinafter "m63344"), which is hereby incorporated by reference. The CLERS op code is described in J. Rossignac, "3D compression made simple: Edgebreaker with ZipandWrap on a corner-table," in Proceedings International Conference on Shape Modeling and Applications, Genova, Italy, 2001 (hereinafter "Rossignac") and H. Lopes, G. Tavares, J. Rossignac, A. Szymczak and A. Safonova, "Edgebreaker: a simple compression for surfaces with handles." in ACM Symposium on Solid Modeling and Applications, Saarbrucken, 2002 (hereinafter "Lopes"), which are both hereby incorporated by reference.

Figure 4:
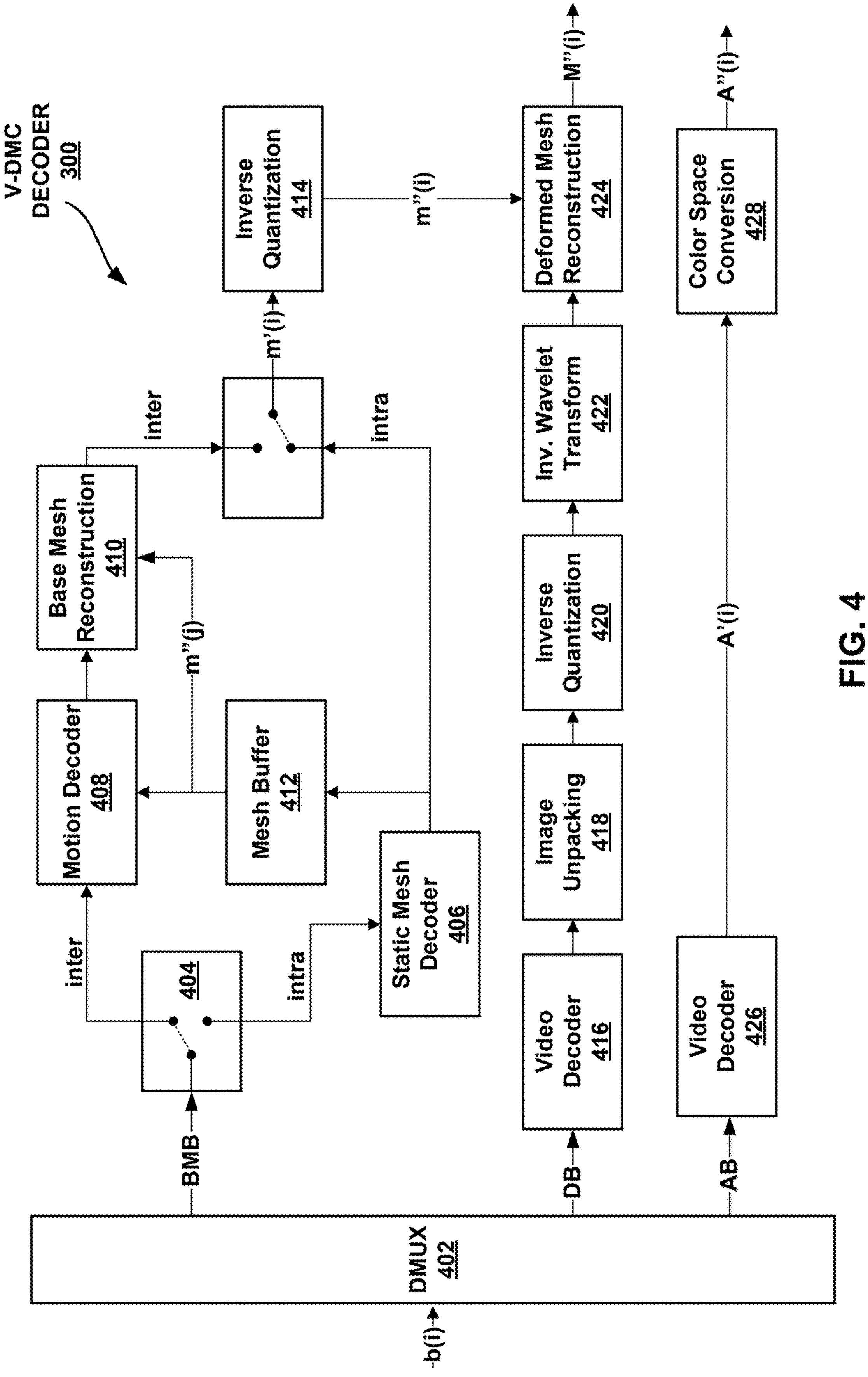

Additionally, V-DMC encoder 200 may estimate the motion of the base mesh vertices and code the motion vectors into the bitstream. The reconstructed base meshes may be subdivided into finer meshes with additional vertices and, hence, additional triangles. V-DMC encoder 200 may refine the positions of the subdivided mesh vertices to approximate the original mesh. The refinements or vertex displacement vectors may be coded into the bitstream. In the current test model, the displacement vectors are wavelet transformed (lifting scheme), quantized, and the coefficients are either packed into a 2D frame or directly coded with an arithmetic coder after inter prediction. The sequence of video frames is coded with a typical video coder, for example, High Efficiency Video Coding (HEVC) Standard or the Versatile Video Coding (VVC) standard, into the bitstream. In addition, the sequence of texture frames is coded with a video coder. The simplified architecture of the V-DMC decoder is illustrated in FIG. 4.

Figure 2:
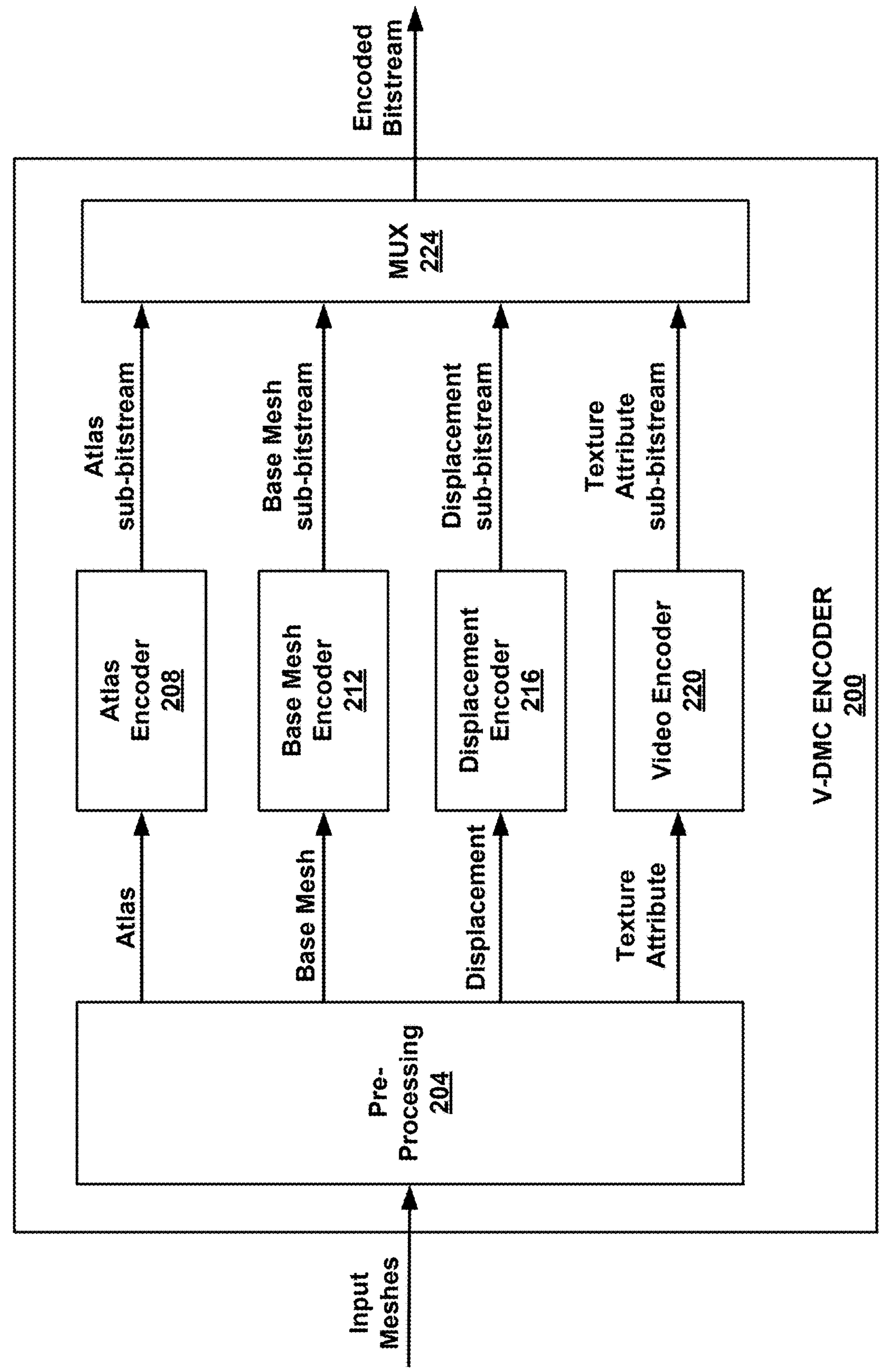
FIG. 2 shows an example implementation of a V-DMC encoder.
Figure 3:
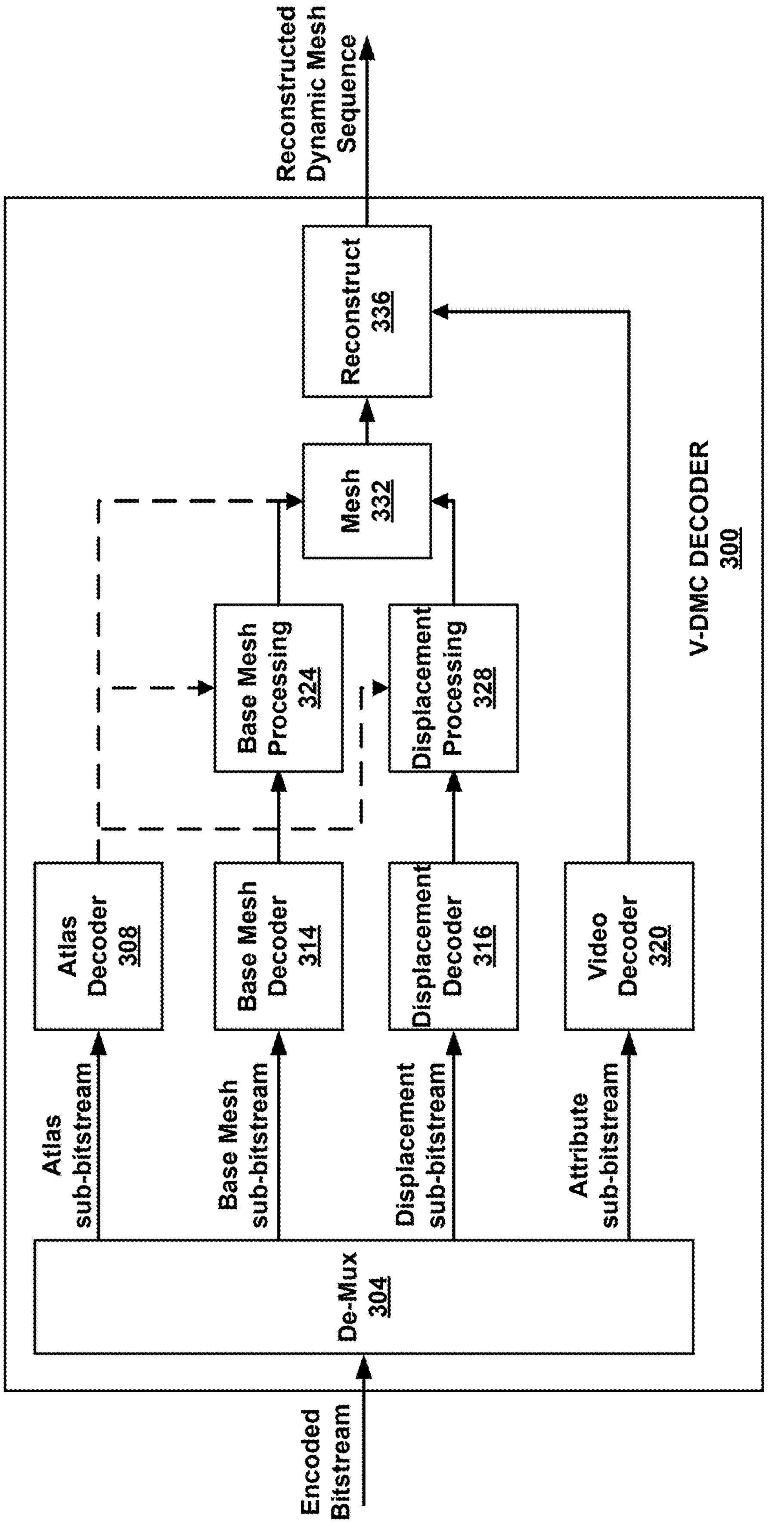
FIGS. 3 and 4 show example implementations of V-DMC decoders.

FIGS. 2 and 3 show the overall system model for the current V-DMC test model (TM) encoder (V-DM encoder 200 in FIG. 2) and decoder (V-DMC decoder 300 in FIG. 3) architecture. V-DMC encoder 200 performs volumetric media conversion, and V-DMC decoder 300 performs a corresponding reconstruction. The 3D media is converted to a series of sub-bitstreams: base mesh, displacement, and texture attributes. Additional atlas information is also included in the bitstream to enable inverse reconstruction, as described in N00680.

FIG. 2 shows an example implementation of V-DMC encoder 200. In the example of FIG. 2, V-DMC encoder 200 includes pre-processing unit 204, atlas encoder 208, base mesh encoder 212, displacement encoder 216, and video encoder 220. Pre-processing unit 204 receives an input mesh sequence and generates a base mesh, the displacement vectors, and the texture attribute maps. Base mesh encoder 212 encodes the base mesh. Displacement encoder 216 encodes the displacement vectors, for example as V3C video components or using arithmetic displacement coding. Video encoder 220 encodes the texture attribute components, e.g., texture or material information, using any video codec, such as HEVC or VVC.

Aspects of V-DMC encoder 200 will now be described in more detail. Pre-processing unit 204 represents the 3D volumetric data as a set of base meshes and corresponding refinement components. This is achieved through a conversion of input dynamic mesh representations into a number of V3C components: a base mesh, a set of displacements, a 2D representation of the texture map, and an atlas. The base mesh component is a simplified low-resolution approximation of the original mesh in the lossy compression and is the original mesh in the lossless compression. The base mesh component can be encoded by base mesh encoder 212 using any mesh codec.

Base mesh encoder 212 may, for example, employ an implementation of the Edgebreaker algorithm, e.g., m63344, for encoding the base mesh where the connectivity is encoded using a CLERS op code, e.g., from Rossignac and Lopes, and the residual of the attribute is encoded using prediction from the previously encoded/decoded vertices' attributes.

Aspects of base mesh encoder 212 will now be described in more detail. One or more submeshes are input to base mesh encoder 212. Submeshes are generated by pre-processing unit 204. Submeshes are generated from original meshes by utilizing semantic segmentation. Each base mesh may include of one or more submeshes.

Base mesh encoder 212 may process connected components. Connected components include of a cluster of triangles that are connected by their neighbors. A submesh can have one or more connected components. Base mesh encoder 212 may encode one "connected component" at a time for connectivity and attributes encoding and then performs entropy encoding on all "connected components".

FIG. 3 shows an example implementation of V-DMC decoder 300. In the example of FIG. 3, V-DMC decoder 300 includes demultiplexer 304, atlas decoder 308, base mesh decoder 314, displacement decoder 316, video decoder 320, base mesh processing unit 324, displacement processing unit 328, mesh generation unit 332, and reconstruction unit 336.

Demultiplexer 304 separates the encoded bitstream into an atlas sub-bitstream, a base-mesh sub-bitstream, a displacement sub-bitstream, and a texture attribute sub-bitstream. Atlas decoder 308 decodes the atlas sub-bitstream to determine the atlas information to enable inverse reconstruction. Base mesh decoder 314 decodes the base mesh sub-bitstream, and base mesh processing unit 324 reconstructs the base mesh. Displacement decoder 316 decodes the displacement sub-bitstream, and displacement processing unit 328 reconstructs the displacement vectors. Mesh generation unit 332 modifies the base mesh based on the displacement vector to form a displaced mesh.

Video decoder 320 decodes the texture attribute sub-bitstream to determine the texture attribute map, and reconstruction unit 336 associates the texture attributes with the displaced mesh to form a reconstructed dynamic mesh.

A more detailed description of the proposal that was selected as the starting point for the V-DMC standardization will now be described. The following description details the displacement vector coding in the current V-DMC test model and working draft, WD 5.0 of V-DMC, ISO/IEC JTC1/SC29/WG7, N00744, October 2023, incorporated herein by reference.

FIG. 4 shows an example implementation V-DMC decoder 300, which may be configured to perform the decoding process as set forth in WD 2.0 of V-DMC, ISO/IEC JTC1/SC29/WG7, N00546, January 2023. The processes described with respect to FIG. 2 may also be performed, in full or in part, by V-DMC encoder 200.

V-DMC decoder 300 includes demultiplexer (DMUX) 402, which receives compressed bitstream b(i) and separates the compressed bitstream into a base mesh bitstream (BMB), a displacement bitstream (DB), and an attribute bitstream (AB). Mode select unit 404 determines if the base mesh data is encoded in an intra mode or an inter mode. If the base mesh is encoded in an intra mode, then static mesh decoder 406 decodes the mesh data without reliance on any previously decoded meshes. If the base mesh is encoded in an inter mode, then motion decoder 408 decodes motion, and base mesh reconstruction unit 410 applies the motion to an already decoded mesh stored in mesh buffer 412 to determine a reconstructed quantized base mesh (m'(i))). Inverse quantization unit 414 applies an inverse quantization to the reconstructed quantized base mesh to determine a reconstructed base mesh (m''(i)).

Video decoder 416 decodes the displacement bitstream to determine a set or frame of quantized transform coefficients. For purposes of encoding and decoding, quantized transform coefficients can be considered to be in a two-dimensional structure, e.g., a frame. Image unpacking unit 418 unpacks, e.g., serializes, the quantized transform coefficients from the frame. Inverse quantization unit 420 inverse quantizes, e.g., inverse scales, quantized transform coefficients to determine de-quantized transform coefficients. Inverse wavelet transform unit 422 applies an inverse transform to the de-quantized transform coefficients to determine a set of displacement vectors. Deformed mesh reconstruction unit 424 deforms the reconstructed base mesh using the decoded displacement vectors to determine a decoded mesh (M"(i)).

Video decoder 426 decodes the attribute bitstream to determine decoded attribute values (A'(i)), and color space conversion unit 428 converts the decoded attribute values into a desired color space to determine final attribute values (A"(i)). The final attribute values correspond to attributes, such as color or texture, for the vertices of the decoded mesh.

Figure 5:
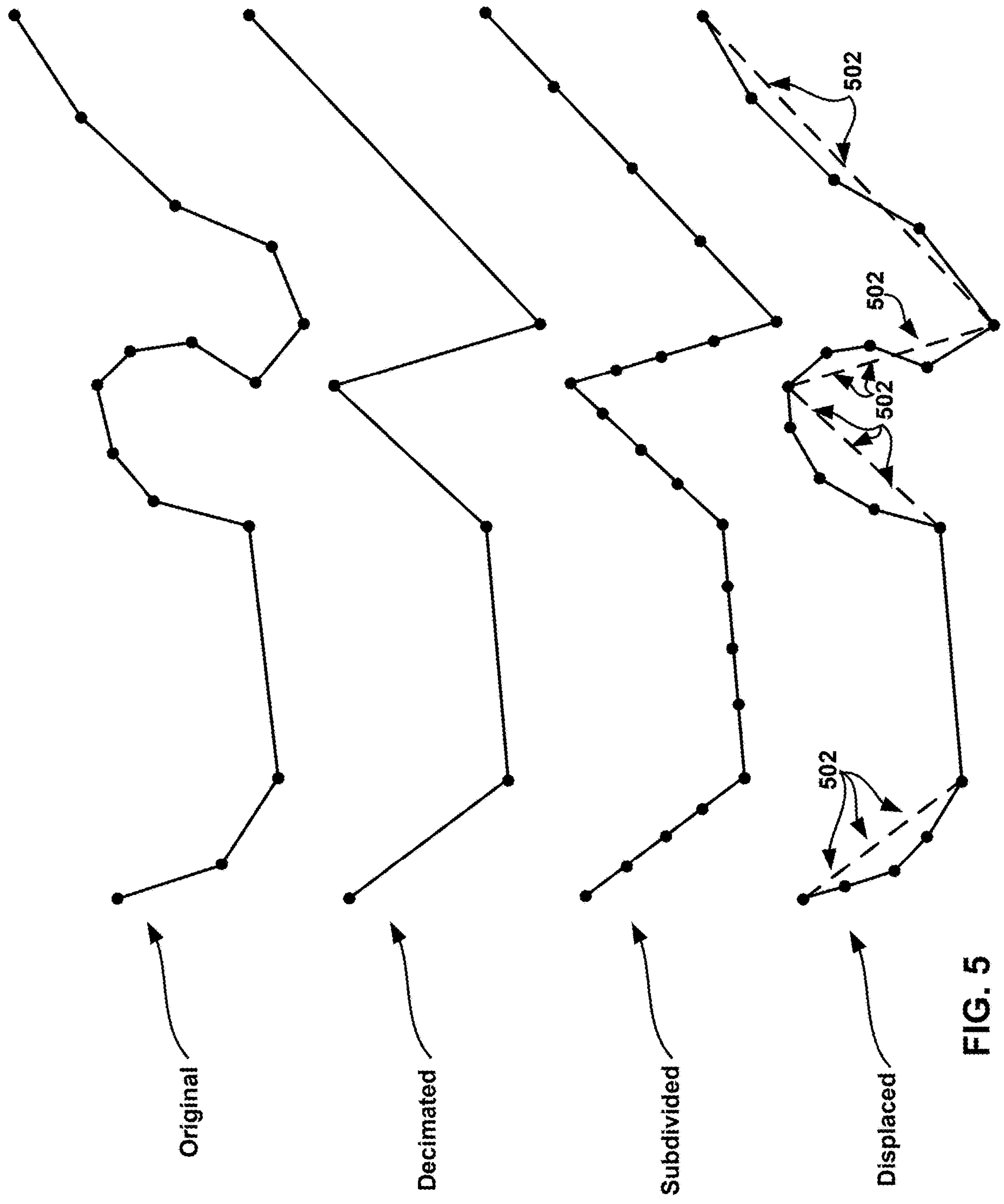
FIG. 5 shows an example of resampling to enable efficient compression of a 2D curve.

FIG. 5 illustrates the basic idea behind the proposed pre-processing scheme by using a 2D curve. The same concepts are applied to the input 3D mesh M(i) to produce a base mesh m(i) and a displacement field d(i).

In FIG. 5, the input 2D curve (represented by a 2D polyline), referred to as the "original" curve, is first down-sampled to generate a base curve/polyline, referred to as the "decimated" curve. A subdivision scheme, such as that described in Garland et al, Surface Simplification Error Using Quadric Metrics (https://www.cs.cmu.edu/~garland/Papers/quadrics.pdf), is then applied to the decimated polyline to generate a "subdivided" curve. For instance, in FIG. 5, a subdivision scheme using an iterative interpolation scheme is applied. The scheme includes inserting at each iteration a new point in the middle of each edge of the polyline. In the example illustrated, two subdivision iterations are applied.

Figure 6:
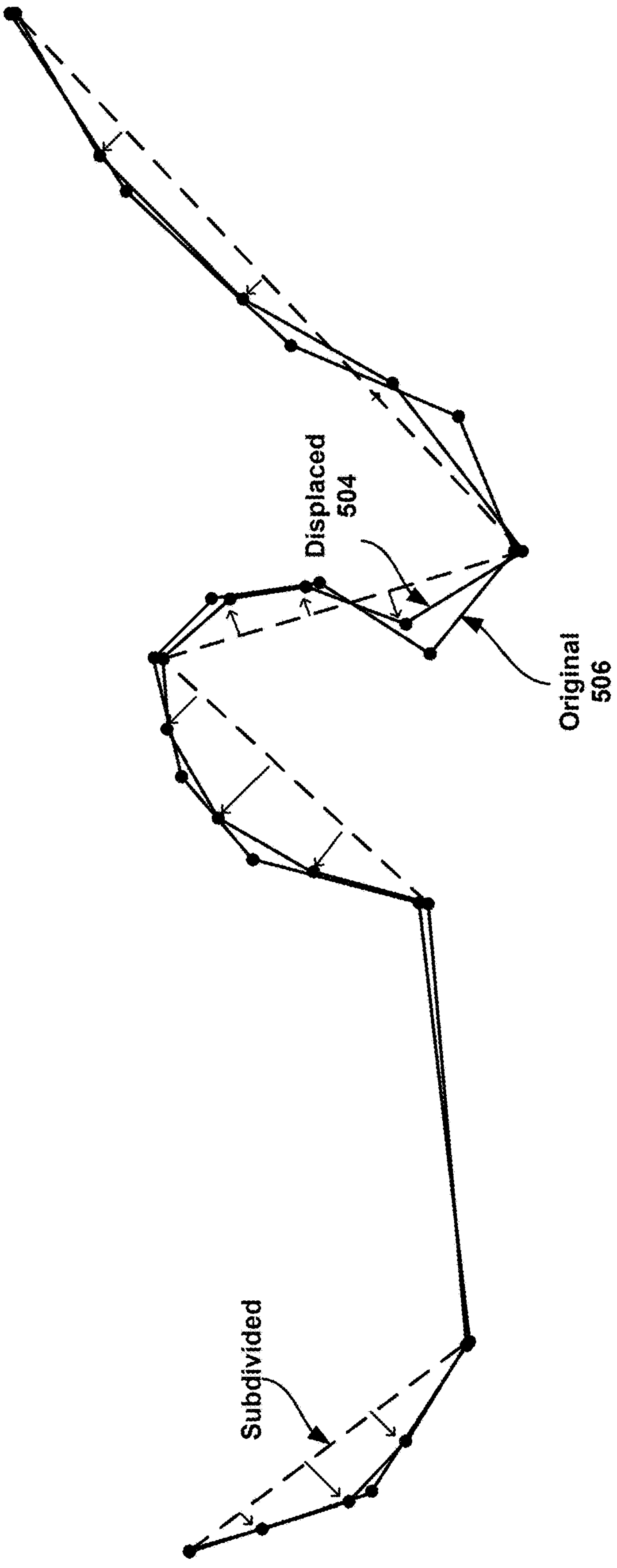
FIG. 6 shows a displaced curve that has a subdivision structure, while approximating the shape of the original mesh.

The proposed scheme is independent of the chosen subdivision scheme and may be combined with other subdivision schemes. The subdivided polyline is then deformed to get a better approximation of the original curve. A displacement vector is computed for each vertex of the subdivided mesh (arrows 502 in FIG. 5) such that the shape of the displaced curve is as close as possible to the shape of the original curve (see FIG. 6). As illustrated by portion 504 of the displaced curve and portion 506 of the original curve, for example, the displaced curve may not perfectly match the original curve.

An advantage of the subdivided curve is that the subdivided curve has a subdivision structure that allows efficient compression, while offering a faithful approximation of the original curve. The compression efficiency is obtained based on:

- The decimated/base curve has a low number of vertices and requires a limited number of bits to be encoded/transmitted.
- The subdivided curve is automatically generated by the decoder once the base/decimated curve is decoded (i.e., no need for any information other than the subdivision scheme type and subdivision iteration count).
- The displaced curve is generated by decoding the displacement vectors associated with the subdivided curve vertices. Besides allowing for spatial/quality scalability, the subdivision structure enables efficient transforms such as wavelet decomposition, which can offer high compression performance.

Figure 7:
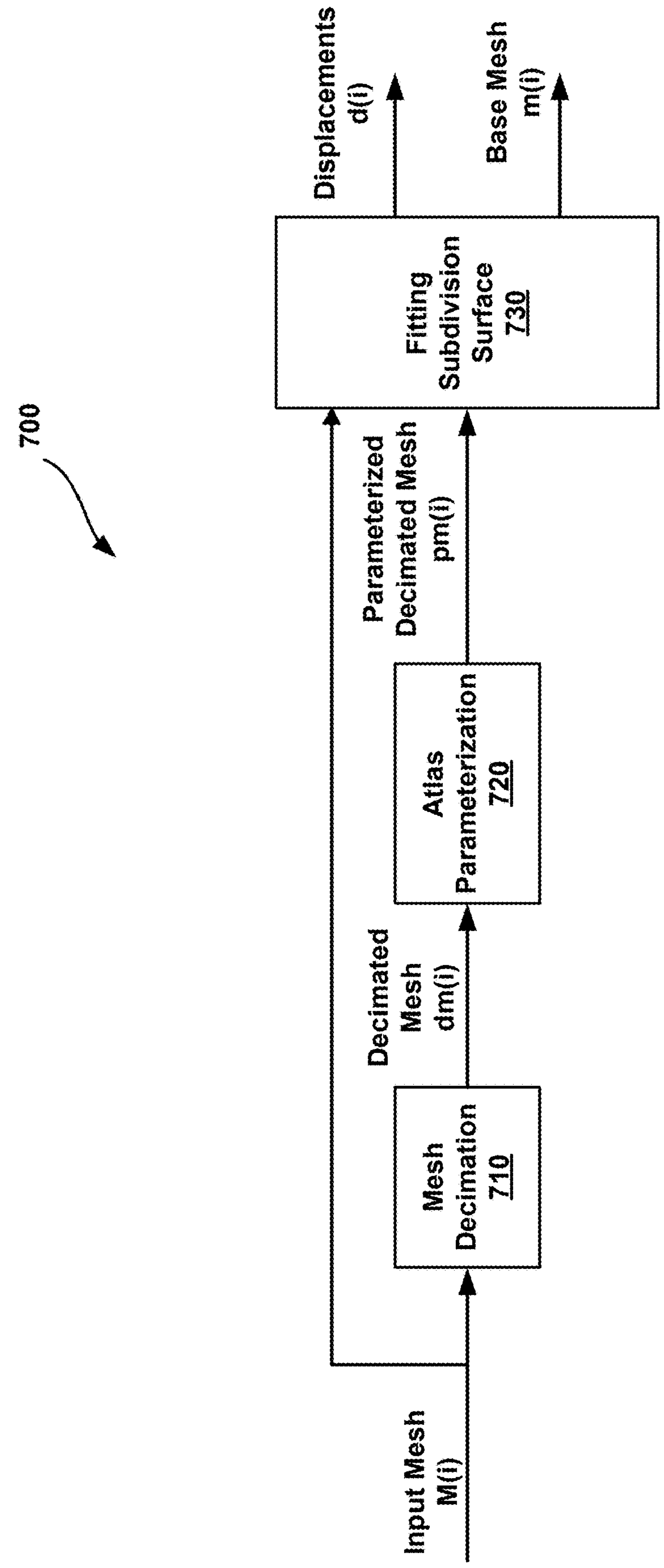
FIG. 7 shows a block diagram of a pre-processing system.

FIG. 7 shows a block diagram of pre-processing system 700 which may be included in V-DMC encoder 200. In the example of FIG. 7, pre-processing system 700 includes mesh decimation unit 710, atlas parameterization unit 720, and subdivision surface fitting unit 730.

Mesh decimation unit 710 uses a simplification technique to decimate the input mesh M(i) and produce the decimated mesh dm(i). The decimated mesh dm(i) is then re-parameterized by atlas parameterization unit 720, which may for example use the UVAtlas tool. The generated mesh is denoted as pm(i). The UVAtlas tool considers only the geometry information of the decimated mesh dm(i) when computing the atlas parameterization, which is likely sub-optimal for compression purposes. Other parameterization schemes or tools may also be used with the proposed framework.

Applying re-parameterization to the input mesh makes it possible to generate a lower number of patches. This reduces parameterization discontinuities and may lead to better RD (rate-distortion) performance. Subdivision surface fitting unit 730 takes as input the re-parameterized mesh pm(i) and the input mesh M(i) and produces the base mesh m(i) together with a set of displacements d(i). First, pm(i) is subdivided by applying the subdivision scheme. The displacement field d(i) is computed by determining for each vertex of the subdivided mesh the nearest point on the surface of the original mesh M(i).

For the Random Access (RA) condition, a temporally consistent re-meshing may be computed by considering the base mesh m(j) of a reference frame with index j as the input for subdivision surface fitting unit 730. This makes it possible to produce the same subdivision structure for the current mesh M'(i) as the one computed for the reference mesh M'(j). Such a re-meshing process makes it possible to skip the encoding of the base mesh m(i) and re-use the base mesh m(j) associated with the reference frame M(j). This may also enable better temporal prediction for both the attribute and geometry information. For example, a motion field f(i) describing how to move the vertices of m(j) to match the positions of m(i) is computed and encoded. Such time-consistent re-meshing may not always possible. The techniques of this disclosure may also include comparing the distortion obtained with and without the temporal consistency constraint and chooses the mode that offers the best RD compromise.

Note that the pre-processing system is not normative and may be replaced by any other system that produces displaced subdivision surfaces. A possible efficient implementation would constrain the 3D reconstruction unit to directly generate displaced subdivision surface and avoids the need for such pre-processing.

V-DMC encoder 200 and V-DMC decoder 300 may be configured to perform displacements coding. Depending on the application and the targeted bitrate/visual quality, the V-DMC encoder 200 may optionally encode a set of displacement vectors associated with the subdivided mesh vertices, referred to herein as the displacement field d(i). The intra encoding process, which may be performed by V-DMC encoder 200, is illustrated in FIG. 8.

Figure 8:
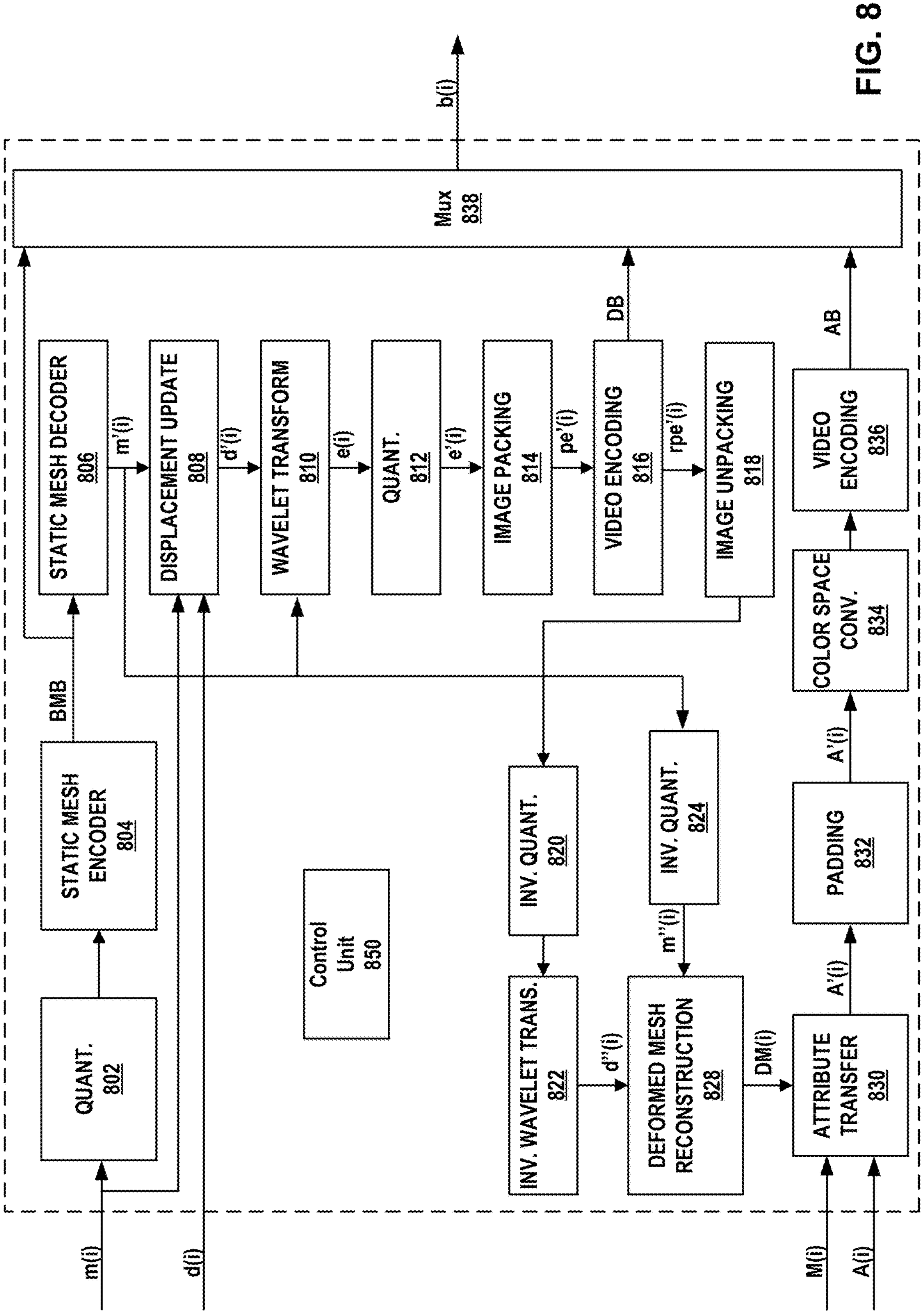
FIG. 8 shows an example implementation of an intra-mode encoder for V-DMC.

FIG. 8 includes the following abbreviations:

m(i)—Base mesh
d(i)—Displacements
m"(i)—Reconstructed Base Mesh
d"(i)—Reconstructed Displacements
A(i)—Attribute Map
A'(i)—Updated Attribute Map
M(i)—Static/Dynamic Mesh
DM(i)—Reconstructed Deformed Mesh
m'(i)—Reconstructed Quantized Base Mesh
d'(i)—Updated Displacements
e(i)—Wavelet Coefficients
e'(i)—Quantized Wavelet Coefficients
pe'(i)—Packed Quantized Wavelet Coefficients rpe'(i)—Reconstructed Packed Quantized Wavelet Coefficients AB—Compressed attribute bitstream DB—Compressed displacement bitstream BMB—Compressed base mesh bitstream b(i)—Compressed bitstream V-DMC encoder 200 receives base mesh m(i) and displacements d(i), for example from pre-processing system 700 of FIG. 7. V-DMC encoder 200 also retrieves mesh M(i) and attribute map A(i).

Quantization unit 802 quantizes the base mesh, and static mesh encoder 804 encodes the quantized based mesh to generate a compressed base mesh bitstream (BMB).

Displacement update unit 808 uses the reconstructed quantized base mesh m'(i) to update the displacement field d(i) to generate an updated displacement field d'(i). This process considers the differences between the reconstructed base mesh m'(i) and the original base mesh m(i). By exploiting the subdivision surface mesh structure, wavelet transform unit 810 applies a wavelet transform to d'(i) to generate a set of wavelet coefficients (e(i)). The scheme is agnostic of the transform applied and may leverage any other transform, including the identity transform. Quantization unit 812 quantizes wavelet coefficients, and image packing unit 814 packs the quantized wavelet coefficients into a 2D image/video that can be compressed using a traditional image/video encoder (e.g., such as using techniques similar to VVC) to generate a displacement bitstream.

Attribute transfer unit 830 converts the original attribute map A(i) to an updated attribute map that corresponds to the reconstructed deformed mesh DM(i). Padding unit 832 pads the updated attributed map by, for example, filling patches of the frame that have empty samples with interpolated samples that may improve coding efficiency and reduce artifacts. Color space conversion unit 834 converts the attribute map into a different color space, and video encoding unit 836 encodes the updated attribute map in the new color space, using for example a video codec, to generate an attribute bitstream.

Multiplexer 838 combines the compressed attribute bitstream, compressed displacement bitstream, and compressed base mesh bitstream into a single compressed bitstream (b(i)).

Image unpacking unit 818 and inverse quantization unit 820 apply image unpacking and inverse quantization to the reconstructed packed quantized wavelet coefficients generated by video encoding unit 816 to obtain the reconstructed version of the wavelet coefficients. Inverse wavelet transform unit 822 applies and inverse wavelet transform to the reconstructed wavelet coefficient to determine reconstructed displacements d"(i).

Inverse quantization unit 824 applies an inverse quantization to the reconstructed quantized base mesh m'(i) to obtain a reconstructed base mesh m"(i). Deformed mesh reconstruction unit 828 subdivides m"(i) and applies the reconstructed displacements d"(i) to its vertices to obtain the reconstructed deformed mesh DM(i).

Image unpacking unit 818, inverse quantization unit 820, inverse wavelet transform unit 822, and deformed mesh reconstruction unit 828 represent a displacement decoding loop. Inverse quantization unit 824 and deformed mesh reconstruction unit 828 represent a base mesh decoding loop. Mesh encoder 800 includes the displacement decoding loop and the base mesh decoding loop so that mesh encoder 800 can make encoding decisions, such as determining an acceptable rate-distortion tradeoff, based on the same decoded mesh that a mesh decoder will generate, which may include distortion due to the quantization and transforms. Mesh encoder 800 may also use decoded versions of the base mesh, reconstructed mesh, and displacements for encoding subsequent base meshes and displacements.

Control unit 850 generally represents the decision making functionality of V-DMC encoder 200. During an encoding process, control unit 850 may, for example, make determinations with respect to mode selection, rate allocation, quality control, and other such decisions.

Figure 9:
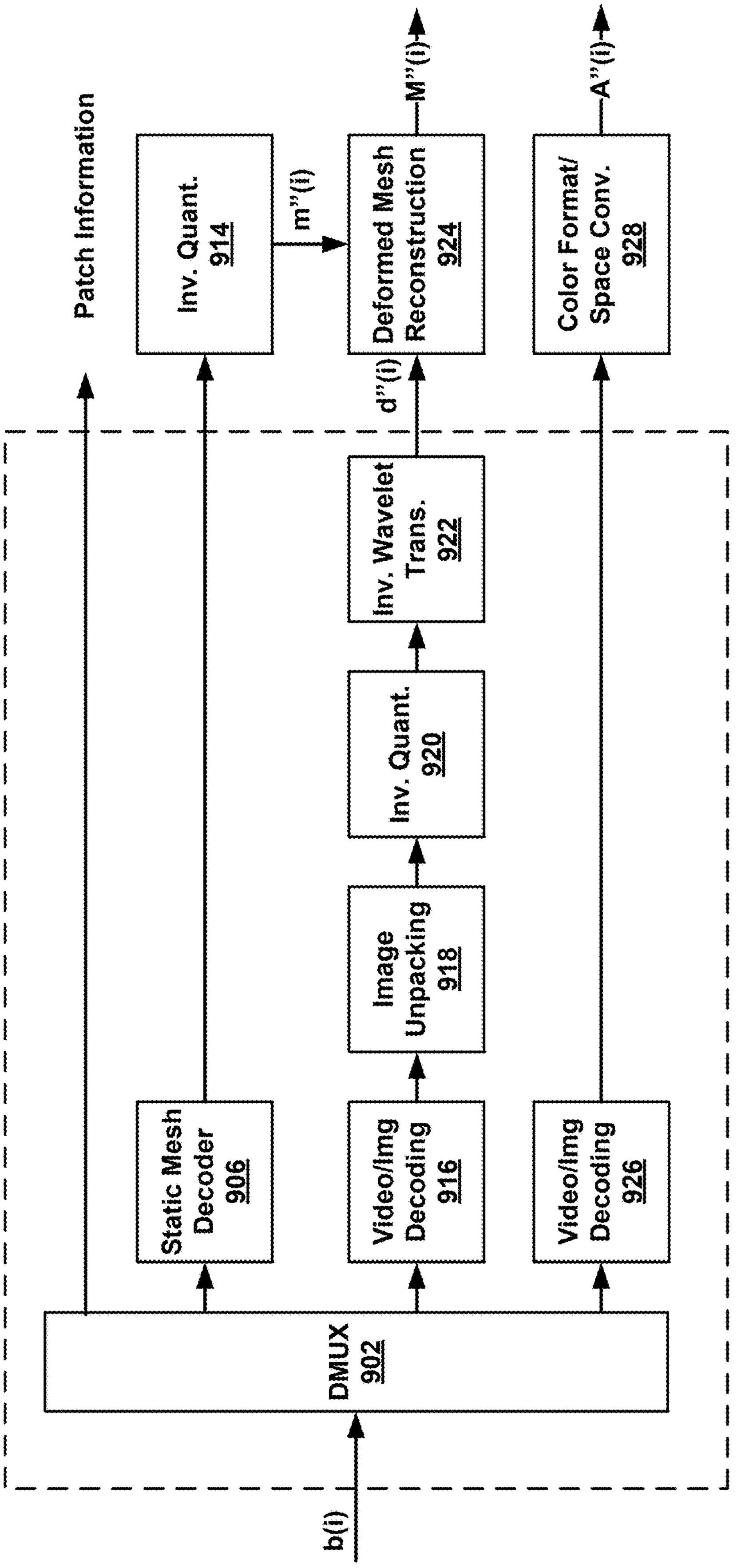
FIG. 9 shows an example implementation of an intra-mode decoder for V-DMC.

FIG. 9 shows a block diagram of an intra decoder which may, for example, be part of V-DMC decoder 300. De-multiplexer (DMUX) 902 separates compressed bitstream (b(i)) into a mesh sub-stream, a displacement sub-stream for positions and potentially for each vertex attribute, zero or more attribute map sub-streams, and an atlas sub-stream containing patch information in the same manner as in V3C/V-PCC.

De-multiplexer 902 feeds the mesh sub-stream to static mesh decoder 906 to generate the reconstructed quantized base mesh m'(i). Inverse quantization unit 914 inverse quantizes the base mesh to determine the decoded base mesh m"(i). Video/image decoding unit 916 decodes the displacement sub-stream, and image unpacking unit 918 unpacks the image/video to determine quantized transform coefficients, e.g., wavelet coefficients. Inverse quantization unit 920 inverse quantizes the quantized transform coefficients to determine dequantized transform coefficients. Inverse transform unit 922 generates the decoded displacement field d"(i) by applying the inverse transform to the unquantized coefficients. Deformed mesh reconstruction unit 924 generates the final decoded mesh (M"(i)) by applying the reconstruction process to the decoded base mesh m"(i) and by adding the decoded displacement field d"(i). The attribute sub-stream is directly decoded by video/image decoding unit 926 to generate an attribute map A"(i). Color format/space conversion unit 928 may convert the attribute map into a different format or color space.

Figure 10:
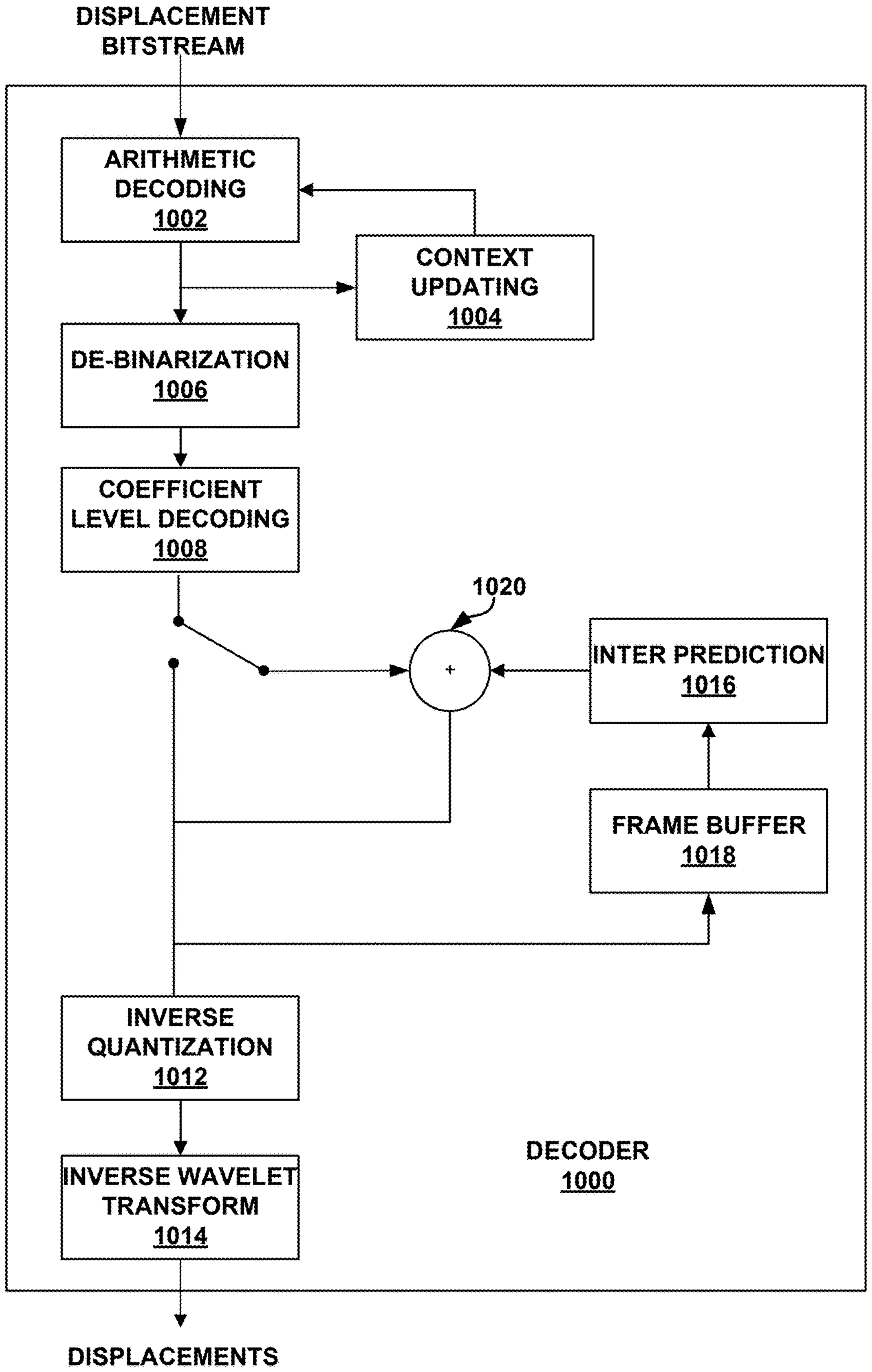
FIG. 10 show an example of a displacement decoder.

As an addition or alternative to packing the quantized wavelet coefficients in frames and coding as images or video, a scheme that directly codes the quantized wavelet coefficients with a block-based arithmetic coder may also be used. This scheme is illustrated in FIG. 10. The decoded quantized wavelet coefficients are inter predicted from the reference buffer, which contains quantized wavelet coefficients from prior frames, for example, the preceding frame. In the example of FIG. 10, decoder 1000 performs context-based arithmetic decoding 1002 of a displacement bitstream based on a context update 1004. Decoder 1000 performs de-binarization 1006 on the context decoded bitstream to determine values for syntax elements and performs coefficient level decoding 1008 on the syntax elements. For intra coded displacements, decoder 1000 performs inverse quantization 1012 on the coefficient levels to determine de-quantized coefficient levels, and then performs an inverse wavelet transform 1014 on the de-quantized coefficient levels to determine the displacements. For inter coded displacements, decoder 1000 performs inter prediction 1016 using reference frames stored in a frame buffer 1018 and adds 1020 the prediction values to the coefficient levels to determine final coefficient levels. Decoder 1000 then performs inverse quantization 1012 on the final coefficient levels to determine de-quantized coefficient levels, and then performs an inverse wavelet transform 1014 on the de-quantized coefficient levels to determine the displacements.

Figure 11:
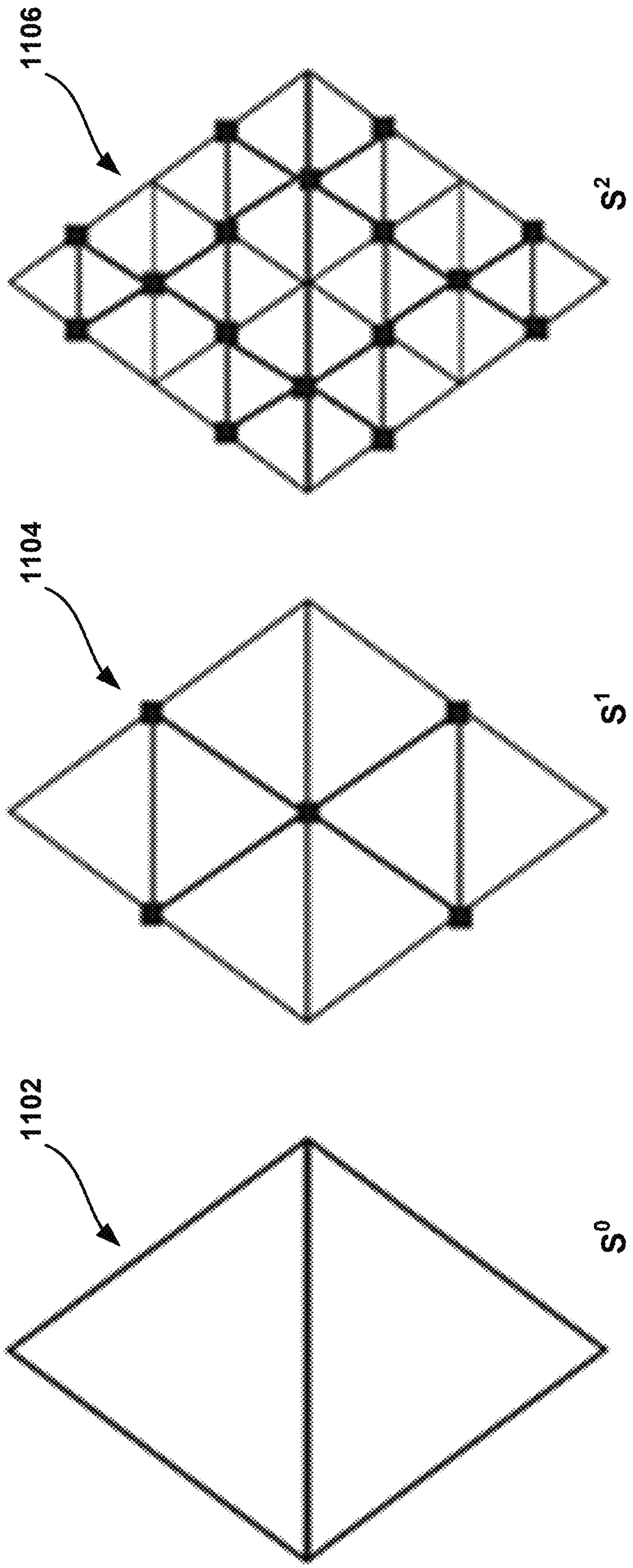
FIG. 11 illustrates a subdivision scheme.

V-DMC encoder 200 and V-DMC decoder 300 may be configured to implement a subdivision scheme. Various subdivision schemes could be considered. A possible solution is the mid-point subdivision scheme, which at each subdivision iteration subdivides each triangle into four sub-triangles as described in FIG. 11. New vertices are introduced in the middle of each edge. In the example, FIG. 11, triangles 1102 are subdivided to obtain triangles 1104, and triangles 1104 are subdivided to obtain triangles 1106. The subdivision process is applied independently to the geometry and to the texture coordinates since the connectivity for the geometry and for the texture coordinates is usually different. The sub-division scheme computes the position $Pos(v_{12})$ of a newly introduced vertex $v_{12}$ at the center of an edge $(v_1, v_2)$, as follows:

$$Pos(v_{12}) = \frac{1}{2}(Pos(v_1) + Pos(v_2)),$$

where $Pos(v_1)$ and $Pos(v_2)$ are the positions of the vertices $v_1$ and $v_2$.

The same process is used to compute the texture coordinates of the newly created vertex. For normal vectors, an extra normalization step is applied as follows:

$$N(v_{12}) = \frac{N(v_1) + N(v_2)}{\|N(v_1) + N(v_2)\|},$$

here:

$N(v_{12})$, $N(v_1)$, and $N(v_2)$ are the normal vectors associated with the vertices $v_{12}$, $v_1$, and $v_2$, respectively.

$\|x\|$ is the norm2 of the vector x.

V-DMC encoder 200 and V-DMC decoder 300 may be configured to apply wavelet transforms. Various wavelet transforms may be applied. The results reported for CfP are based on a linear wavelet transform.

The prediction process is defined as follows:

$$\text{Signal}(v) \leftarrow \text{Signal}(v) - \frac{1}{2}(\text{Signal}(v_1) + \text{Signal}(v_2))$$

where v is the vertex introduced in the middle of the edge $(v_1, v_2)$, and

Signal(v), $\text{Signal}(v_1)$, and $\text{Signal}(v_2)$ are the values of the geometry/vertex attribute signals at the vertices v, $v_1$, and $v_2$, respectively.

The updated process is as follows:

$$\text{Signal}(v) \leftarrow \text{Signal}(v) + \frac{1}{8}\sum_{w \in v^*} \text{Signal}(w)$$

where v* is the set of neighboring vertices of the vertex v.

The scheme may allow to skip the update process. The wavelet coefficients could be quantized e.g., by using a uniform quantizer with a dead zone.

V-DMC encoder 200 and V-DMC decoder 300 may be configured to use local or canonical coordinate systems for displacements. The displacement field d(i) is defined in the same cartesian coordinate system as the input mesh. A possible optimization is to transform d(i) from this canonical coordinate system to a local coordinate system, which is defined by the normal to the subdivided mesh at each vertex.

The advantage of considering a local coordinate system for the displacements is the possibility to quantize more heavily the tangential components of the displacements compared to the normal component. In fact, the normal component of the displacement has more significant impact on the reconstructed mesh quality than the two tangential components.

V-DMC encoder 200 and V-DMC decoder 300 may be configured to pack (and unpack) wavelet coefficients. The following scheme may be used to pack the wavelet coefficients into a 2D image:

Traverse the coefficients from low to high frequency.

For each coefficient, determine the index of the N×M pixel block (e.g., N=M=16) in which it should be stored following a raster order for blocks.

The position within the N×M pixel block is computed by using a Morton order to maximize locality.

Other packing schemes may also be used (e.g., zigzag order, raster order). The encoder may explicitly signal in the bitstream the used packing scheme (e.g., atlas sequence parameters). This could be done at patch, patch group, tile, or sequence level.

V-DMC encoder 200 and V-DMC decoder 300 may be configured to displacement video encoding and decoding.

The proposed scheme is agnostic as to which video coding technology is used. When coding the displacement wavelet coefficients, a lossless approach may be used since the quantization is applied in a separate module. Another approach is to rely on the video encoder to compress the coefficients in a lossy manner and apply a quantization either in the original or transform domain.

Table 1 shows an example of Lifting Transform Parameter Set, which may be encoded and decoded by V-DMC encoder 200 and V-DMC decoder 300, respectively.

TABLE 1

| | Descriptor |
|---|---|
| vmc_lifting_transform_parameters( index, ltpIndex ){ | |
| vmc_transform_lifting_skip_update_flag[index][ ltpIndex ] | u(1) |
| vmc_transform_lifting_quantization_parameters_x[index][ ltpIndex ] | u(6) |
| vmc_transform_lifting_quantization_parameters_y[index][ ltpIndex ] | u(6) |
| vmc_transform_lifting_quantization_parameters_z[index][ ltpIndex ] | u(6) |
| vmc_transform_log2_lifting_lod_inverse_scale_x[index][ ltpIndex ] | ue(v) |
| vmc_transform_log2_lifting_lod_inverse_scale_y[index][ ltpIndex ] | ue(v) |
| vmc_transform_log2_lifting_lod_inverse_scale_z[index][ ltpIndex ] | ue(v) |
| vmc_transform_log2_lifting_update_weight[index][ ltpIndex ] | ue(v) |
| vmc_transform_log2_lifting_prediction_weight[index][ ltpIndex ] | ue(v) |
| } | |

syntax_element[i][ltpIndex] with i equal to 0 may be applied to the displacement. syntax_element[i][ltpIndex] with i equal to non-zero may be applied to the (i−1)-th attribute, where ltpIndex is the index of the lifting transform parameter set list.

vmc_transform_lifting_skip_update_flag[i][ltpIndex] equal to 1 indicates the step of the lifting transform applied to the displacement is skipped in the vmc_lifting_transform_parameters (index, lptIndex) syntax structure, where ltpIndex is the index of the lifting transform parameter set list. vmc_transform_lifting_skip_update_flag[i][ltpIndex] with i equal to 0 may be applied to the displacement. vmc_transform_lifting_skip_update_flag[i][ltpIndex] with i equal to non-zero may be applied to the (i−1)-th attribute.

vmc_transform_lifting_quantization_parameters_x[i][ltpIndex] indicates the quantization parameter to be used for the inverse quantization of the x-component of the displacements wavelets coefficients. The value of vmc_transform_lifting_quantization_parameters_x[index][ltpIndex] shall be in the range of 0 to 51, inclusive.

vmc_transform_lifting_quantization_parameters_y[i][ltpIndex] indicates the quantization parameter to be used for the inverse quantization of the y-component of the displacements wavelets coefficients. The value of vmc_transform_lifting_quantization_parameters_x[index][ltpIndex] shall be in the range of 0 to 51, inclusive.

vmc_transform_lifting_quantization_parameters_z[i][ltpIndex] indicates the quantization parameter to be used for the inverse quantization of the z-component of the displacements wavelets coefficients. The value of vmc_transform_lifting_quantization_parameters_x[index][ltpIndex] shall be in the range of 0 to 51, inclusive.

vmc_transform_log 2_lifting_lod_inverse_scale_x[i][ltpIndex] indicates the scaling factor applied to the x-component of the displacements wavelets coefficients for each level of detail.

vmc_transform_log 2_lifting_lod_inverse_scale_y[i][ltpIndex] indicates the scaling factor applied to the y-component of the displacements wavelets coefficients for each level of detail.

vmc_transform_log 2_lifting_lod_inverse_scale_z[i][ltpIndex] indicates the scaling factor applied to the z-component of the displacements wavelets coefficients for each level of detail.

vmc_transform_log 2_lifting_update_weight[i][ltpIndex] indicates the weighting coefficients used for the update filter of the wavelet transform.

vmc_transform_log 2_lifting_prediction_weight[i][ltpIndex] the weighting coefficients used for the prediction filter of the wavelet transform.

V-DMC decoder 300 may be configured to perform inverse image packing of wavelet coefficients.

Inputs to this process are:

- width, which is a variable indicating the width of the displacements video frame,
- height, which is a variable indicating the height of the displacements video frame,
- bitDepth, which is a variable indicating the bit depth of the displacements video frame,
- dispQuantCoeffFrame, which is a 3D array of size width×height×3 indicating the packed quantized displacement wavelet coefficients.
- blockSize, which is a variable indicating the size of the displacements coefficients blocks,
- positionCount, which is a variable indicating the number of positions in the subdivided submesh.

The output of this process is dispQuantCoeffArray, which is a 2D array of size positionCount×3 indicating the quantized displacement wavelet coefficients.

Let the function extracOddBits(x) be defined as follows:

```
x = extracOddBits( x ) {
  x = x & 0x55555555
  x = (x | (x >> 1)) & 0x33333333
  x = (x | (x >> 2)) & 0x0F0F0F0F
  x = (x | (x >> 4)) & 0x00FF00FF
  x = (x | (x >> 8)) & 0x0000FFFF
}
```

Let the function computeMorton2D(i) be defined as follows:

```
(x, y) = computeMorton2D( i ) {
  x = extracOddBits( i >> 1 )
  y = extracOddBits( i )
}
```

The wavelet coefficients inverse packing process proceeds as follows:

```
pixelsPerBlock = blockSize * blockSize
widthInBlocks = width / blockSize
shift = (1 << bitDepth) >> 1
for( v = 0; v < positionCount; v++ ) {
  blockIndex = v / pixelsPerBlock
  indexWithinBlock = v % pixelsPerBlock
  x0 = (blockIndex % widthInBlocks) * blockSize
  y0 = (blockIndex / widthInBlocks) * blockSize
  ( x, y ) = computeMorton2D(indexWithinBlock)
  x = x0 + x
  y = y0 + y
  for( d = 0; d < 3; d++ ) {
    dispQuantCoeffArray[ v ][ d ] = dispQuantCoeffFrame[ x ][ y ][ d
    ] − shift
  }
}
```

V-DMC decoder 300 may be configured to perform inverse quantization of wavelet coefficients.

Inputs to this process are:

- positionCount, which is a variable indicating the number of positions in the subdivided submesh.
- dispQuantCoeffArray, which is a 2D array of size positionCount×3 indicating the quantized displacement wavelet coefficients.
- subdivisionIterationCount, which is a variable indicating the number of subdivision iterations.
- liftingQP, which is a 1D array of size 3 indicating the quantization parameter associated with the three displacement dimensions.
- liftingLevelOfDetailInverseScale, which is a 1D array of size 3 indicating the inverse scale factor associated with the three displacement dimensions
- levelOfDetailAttributeCounts, a 1D array of size (subdivisionIterationCount+1) indicating the number of attributes associated with each subdivision iteration.
- bitDepthPosition, which is a variable indicating the bit depth of the mesh positions.

The output of this process is dispCoeffArray, which is a 2D array of size positionCount×3 indicating the dequantized displacement wavelet coefficients.

The wavelet coefficients inverse quantization process proceeds as follows:

```
for ( d =0; d < 3; ++d) {
   qp = liftingQP[ d ]
   iscale[ d ] = qp >= 0 ? pow( 0.5, 16 − bitDepthPosition + ( 4 − qp ) /
6)
   : 0.0
   ilodScale[ d ] = liftingLevelOfDetailInverseScale[ d ]
}
vcount0 = 0
for( i = 0; i < subdivisionIterationCount; i++ ) {
   vcount1 = levelOfDetailAttributeCounts[ i ]
   for( v = vcount0; v < vcount1; v++ ) {
      for( d = 0; d < 3; d++ ) {
         dispCoeffArray[ v ][ d ] = dispQuantCoeffArray[ v ][ d ] * iscale[
         k ]
      }
   }
   vcount0 = vcount1
   for( d = 0; d < 3; d++ ) {
      iscale[d] *= ilodScale[ d ]
   }
}
```

V-DMC decoder 300 may be configured to perform inverse linear wavelet transform.

Inputs to this process are:

positionCount, which is a variable indicating the number of positions in the subdivided submesh.

dispCoeffArray, which is a 2D array of size positionCount×3 indicating the displacement wavelet coefficients.

levelOfDetailAttributeCounts, a 1D array of size (subdivisionIterationCount+1) indicating the number of attributes associated with each subdivision iteration.

edges, which is a 2D array of size positionCount×2 which indicates for each vertex v produced by the subdivision process. The two indices (a, b) of the two vertices used to generated it (i.e., v generated as the middle of the edge (a, b)).

updateWeight, which is a variable indicating the lifting update weight.

predWeight, which is a variable indicating the lifting prediction weight.

skipUpdate, which is a variable indicating whether the update operation should be skipped (when 1) or not (when 0).

The output of this process is dispArray, which is a 2D array of size positionCount×3 indicating the displacements to be applied to the mesh positions.

The inverse wavelet transform process proceeds as follows:

```
   for( i = 0; i < subdivisionIterationCount; i++ ) {
      vcount0 = levelOfDetailAttributeCounts[i]
      vcount1 = levelOfDetailAttributeCounts[i + 1]
      for ( v = vcount0; skipUpdate == 0 && v < vcount1; ++v ) {
         a = edges[v][0]
         b = edges[v][1]
         for( d = 0; d < 3; d++ ) {
            disp = updateWeight * dispCoeffArray[v][d]
            signal[a][d] −= disp
            signal[b][d] −= disp
         }
      }
      for ( v = vcount0; skipUpdate == 0 && v < vcount1; ++v ) {
         a = edges[v][0]
         b = edges[v][1]
         for( d = 0; d < 3; d++ ) {
            dispCoeffArray[v][d] +=
```

-continued

```
               predWeight * (dispCoeffArray[a][d] +
dispCoeffArray[b][d])
         }
      }
   }
   for ( v = 0; v < positionCount; ++v ) {
      for( d = 0; d < 3; d++ ) {
         dispArray[v][d] = dispCoeffArray[v][d]
      }
   }
```

V-DMC decoder 300 may be configured to perform positions displacement.

The inputs of this process are:

positionCount, which is a variable indicating the number of positions in the subdivided submesh.

positionsSubdiv, which is a 2D array of size positionCount×3 indicating the positions of the subdivided submesh.

dispArray, which is a 2D array of size positionCount×3 indicating the displacements to be applied to the mesh positions.

normals, which is a 2D array of size positionCount×3 indicating the normals to be used when applying the displacements to the submesh positions.

tangents, which is a 2D array of size positionCount×3 indicating the tangents to be used when applying the displacements to the submesh positions.

bitangents, which is a 2D array of size positionCount×3 indicating the tangents to be used when applying the displacements to the submesh positions.

The output of this process is positionsDisplaced, which is a 2D array of size positionCount×3 indicating the positions of the displaced subdivided submesh.

The positions displacement process proceeds as follows:

```
   for ( v = 0; v < positionCount; ++v ) {
      for( d = 0; d < 3; d++ ) {
         positionsDisplaced[ v ][ d ] = positionsSubdiv[ v ][ d ] +
            dispArray[ v ][ 0 ] * normals[ v ][ d ] +
            dispArray[ v ][ 1 ] * tangents[ v ][ d ] +
            dispArray[ v ][ 2 ] * bitangents[ v ][ d ]
      }
   }
```

Figure 12:
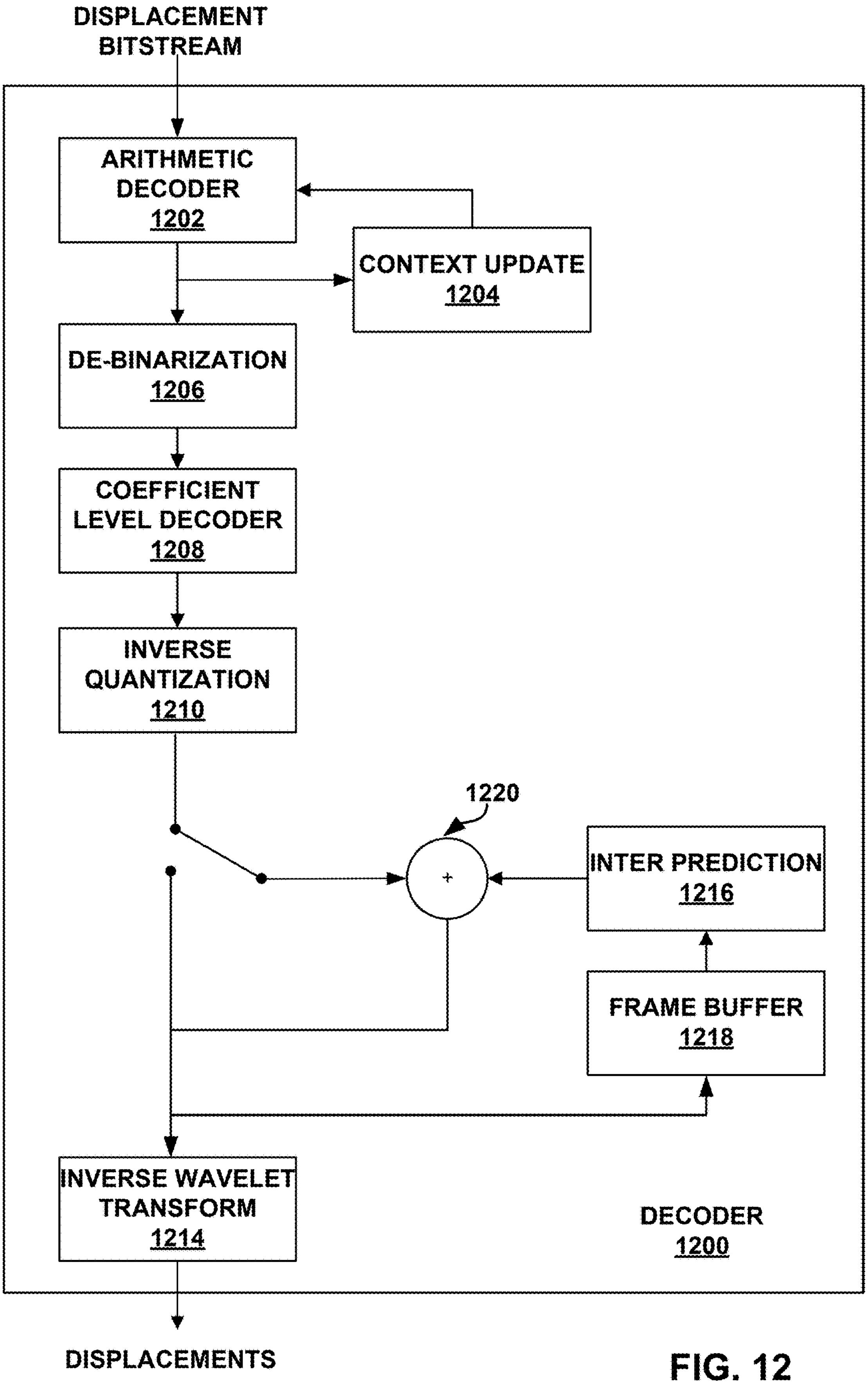
FIG. 12 show an example of a displacement decoder process.

As described above with respect to displacement video encoding, inter prediction may be performed on quantized wavelet coefficients (lifting scheme) after the arithmetic decoding of displacements. More recently, H. Nishimura, K. Kawamura, K. Kishimoto, J. Xu, "[V-DMC][EE4.7 Test 5.1] Quantization after Inter Prediction in Arithmetic Coding-based Displacement Coding," ISO/IEC JTC1/SC29/WG7, m64391, July 2023 (hereinafter m64391), incorporated herein by reference, introduced inter prediction of the wavelet coefficients themselves after inverse quantization as is illustrated in FIG. 12. The inverse quantized coefficients (residuals) are added to the inter predicted values that are stored in the frame buffer. The benefit is that correlation between wavelet coefficients of adjacent frames is greater than the correlation between the corresponding quantized coefficients, which results in additional coding efficiency gains. However, the inverse quantization process is implemented as floating point operations, which are known to produce results that are operation order and platform implementation dependent. Since the reconstructed wavelet coefficients are stored in the frame buffer for inter prediction, the floating-point operations may result in different reconstructed wavelet coefficients at the encoder and decoder if the implementation differs.

FIG. 12 shows an arithmetic decoding process of a displacements bitstream. In the example of FIG. 12, decoder 1200 performs context-based arithmetic decoding 1202 of a displacement bitstream based on a context update 1204. Decoder 1200 performs de-binarization 1206 on the context decoded bitstream to determine values for syntax elements and performs coefficient level decoding 1208 on the syntax elements. Decoder 1200 then inverse quantizes 1210 the coefficient level to determine dequantized coefficients. For intra coded displacements, decoder 1200 performs an inverse wavelet transform 1214 on the de-quantized coefficient levels to determine the displacements. For inter coded displacements, decoder 1200 performs inter prediction 1016 using reference frames stored in a frame buffer 1218 and adds 1220 the prediction values to the dequantized coefficient levels to determine final dequantized coefficient levels. Decoder 1200 then performs an inverse wavelet transform 1214 on the final de-quantized coefficient levels to determine the displacements.

According to the techniques of this disclosure, V-DMC encoder 200 and V-DMC decoder 300 may be configured to perform displacement wavelet coefficient inter prediction with fixed-point inverse quantization. This disclosure describes techniques to integrate the fixed-point (or integer) inverse quantizer, as described in U.S. Provisional Patent Application 63/586,120, filed 28 Sep. 2023, incorporated herein by reference, to mitigate the potential drift problem due to floating point operations in the inverse quantizer process. In addition, the integer arithmetic may be deterministically specified in the standard specification.

Figure 13B:
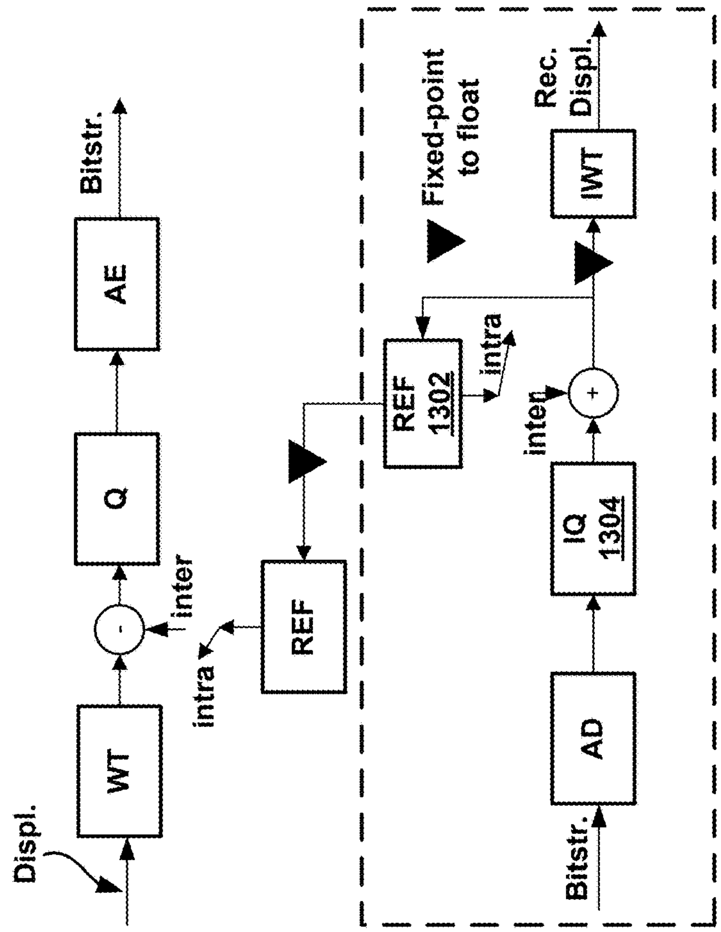
FIG. 13B shows an example of a fixed-point displacement decoder.
Figure 13A:
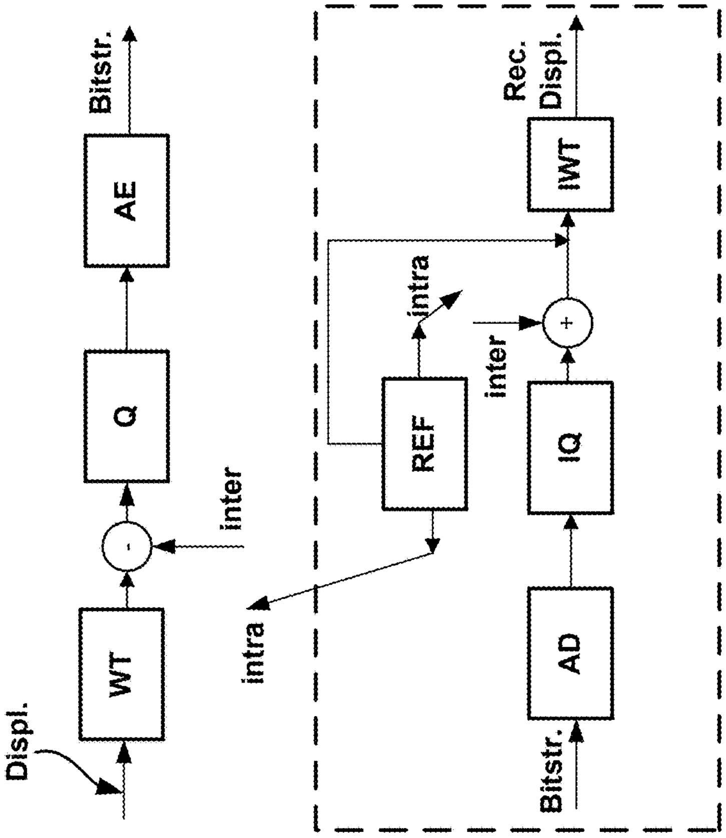
FIG. 13A shows an example of a floating-point displacement decoder.

FIG. 13A shows a floating-point implementation of decoding. FIG. 13B shows a decoding implementation with fixed-point inverse quantization and reference buffer. Specifically, in FIG. 13B, REF 1302 and IQ 1304 may perform fixed-point functions.

FIG. 13A illustrates the process described in m64391 and is a simplified version of FIG. 12. After wavelet transforming (WT) the displacements (1D or 3D) a predictor from the reference buffer (REF) is subtracted and subsequently quantized (Q). The arithmetic encoder (AE) codes the quantized residuals into the bitstream. At the decoder side the displacements are reconstructed (Rec. Displ.). The reconstructed wavelet coefficients are obtained after arithmetic decoding (AD), inverse quantization (IQ), and adding the predictors from the reference buffer. These coefficients that are obtained before the inverse wavelet transform (IWT) are also required on the encoder side to be stored in the reference buffer for predicting future frames of wavelet coefficients.

FIG. 13B illustrates aspects of this disclosure. After arithmetic decoding, the fixed-point (integer) inverse quantization process (IQ 1304) (U.S. Provisional Patent Application 63/586,120) is applied). Note that the AD outputs integer type residuals that can be converted to fixed-point values in a trivial manner, for example, by left bit shifting. Subsequently the inverse quantized residuals are added to the predictors from the reference buffer (1302), which were also stored as fixed-point values. In this encoder example, the IWT is implemented in floating-point arithmetic as well as the encoder's reference buffer, hence, a conversion from fixed-point to floating point is included (downwards triangles).

In some examples, the conversion from fixed-point to floating point may not performed; all the operations are implemented in the fixed-point domain. In this case, a scaling operation (e.g., multiplication/division, shifting with or without offset) may be performed to match the precision of values. For example, the inverse quantized residuals may be in fixed-point domain with a particular precision P1; the IWT may expect the input to be in a fixed-point representation of a different precision P2. In this case, the precision of the residuals may be converted from P1 to P2 by multiplication/shift left (with or without offset) when P2>P1, or division/shift right (with or without offset) when P2<P1. Similarly changes to precision may be performed in other steps of the coding process.

Note that both intra and inter coding is supported in these architectures. In inter mode the predictors can be determined from a single reference frame that was decoded prior to the current frame or from multiple references, for example, bi-directional inter prediction. The lifting transform is applied in a hierarchy that results in one or multiple levels of detail (LoD). The inter predictors can be obtained from corresponding LoDs in reference frames on a per sample basis if the order of the vertices in the current and reference frames is identical. If the order is not identical then an index mapping is required. The selection between intra and inter prediction can be determined at the frame level, LoD level, block/segment/submesh level, or sample/coefficient level, etc.

In some examples, when the location (say L1) of a vertex in the current frame does not match the location of any vertex in the reference frame, a coefficient/displacement vector is derived for location L1 in the reference frame from the location of one or more vertices in the reference frame, where, this derivation may be performed by interpolating coefficients/displacement vectors of two or more neighbouring points, where the weights used for interpolation may be fixed or variable (e.g., based on distance of the neighbouring points from L1), and the derived coefficient/displacement vector may be used in inter prediction.

In some examples, for a vertex location L1 in the current frame a coefficient/displacement vector is derived for a location L1 in the reference frame from the location of one or more vertices in the reference frame, where, this derivation may be performed by filtering coefficients/displacement vectors of two or more neighbouring points, where the filter coefficients used for may be fixed or variable (e.g., based on distance of the neighbouring points from L1), and the derived coefficient/displacement vector may be used in inter prediction. (NOTE: in this example, the reference may or may not contain a vertex at location L1).

Also note that the transform can be any transform that meaningfully decorrelates the displacement values for efficient compression. In another example, the transform may be omitted.

In the V-DMC framework, the motion is determined at the basemesh level. The vertex positions of the current mesh may be determined by applying motion vectors to the vertex positions of the reference basemesh. After mesh subdivision of the current mesh the displacement vectors are computed and coded using the presented schemes.

Figure 14A:
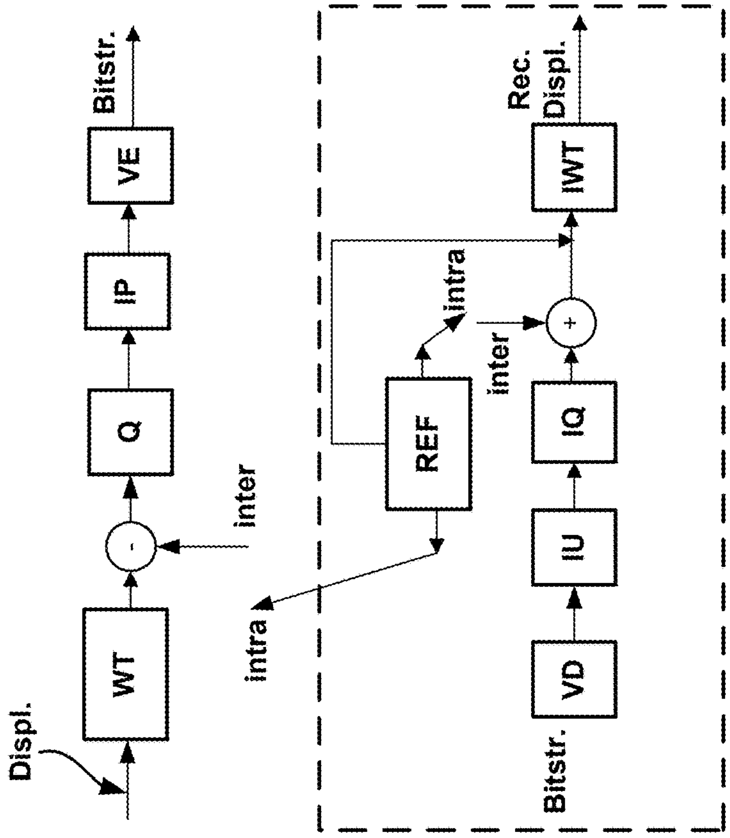
FIG. 14A shows an example of a floating-point displacement decoder.
Figure 14B:
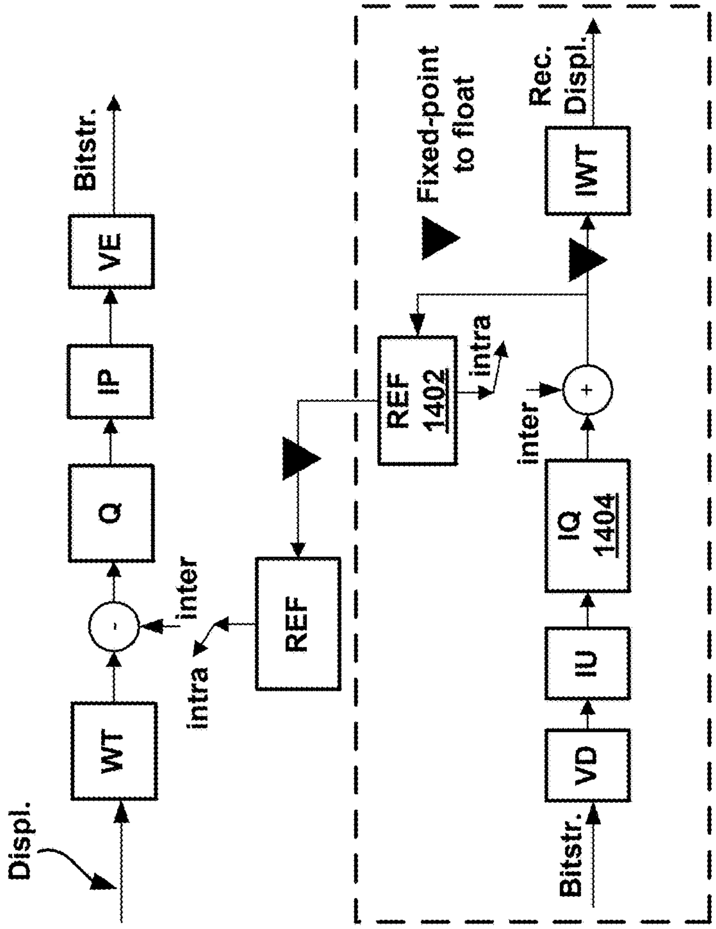
FIG. 14B shows an example of a fixed-point displacement decoder.

As an addition or an alternative to the arithmetic coding of the displacements, the video frame packing and coding mode of V-DMC can be enabled as described in Toshiyasu Sugio, "[V-DMC][EE4.7-related][New] LoD based inter prediction for displacement vector coding," ISO/IEC JTC1/SC29/WG7, m65426, October 2023, incorporated herein by reference, which changes the schemes as illustrated in FIGS. 14A and 14B.

FIG. 14A Floating-point implementation. FIG. 14B Implementation with fixed-point inverse quantization (1404) and reference buffer (1402).

Figure 15:
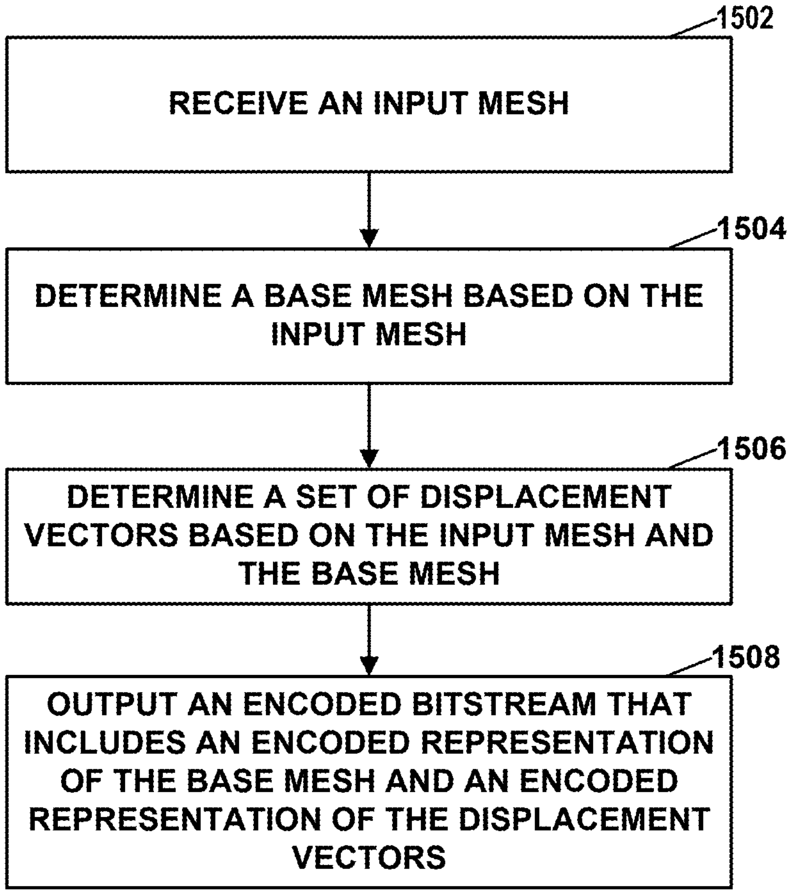
FIG. 15 is a flowchart illustrating an example process for encoding a mesh.

FIG. 15 is a flowchart illustrating an example process for encoding a mesh. Although described with respect to V-DMC encoder 200 (FIGS. 1 and 2), it should be understood that other devices may be configured to perform a process similar to that of FIG. 15.

In the example of FIG. 15, V-DMC encoder 200 receives an input mesh (1502). V-DMC encoder 200 determines a base mesh based on the input mesh (1504). V-DMC encoder 200 determines a set of displacement vectors based on the input mesh and the base mesh (1506). V-DMC encoder 200 outputs an encoded bitstream that includes an encoded representation of the base mesh and an encoded representation of the displacement vectors (1508). V-DMC encoder 200 may additionally determine attribute values from the input mesh and include an encoded representation of the attribute values vectors in the encoded bitstream.

Figure 16:
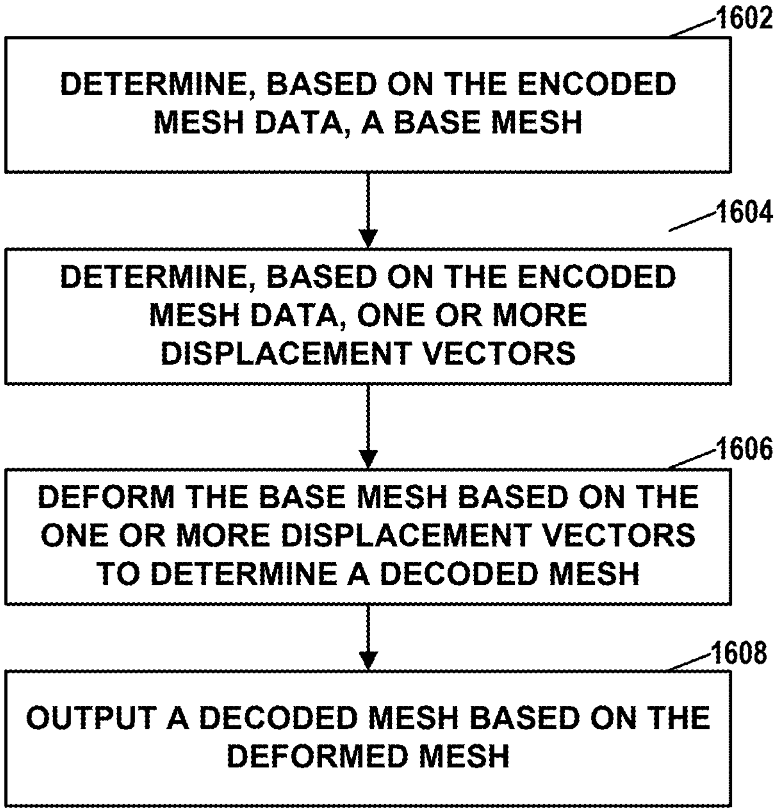
FIG. 16 is a flowchart illustrating an example process for decoding a compressed bitstream of mesh data.

FIG. 16 is a flowchart illustrating an example process for decoding a compressed bitstream of mesh data. Although described with respect to V-DMC decoder 300 (FIGS. 1 and 3), it should be understood that other devices may be configured to perform a process similar to that of FIG. 16.

In the example of FIG. 16, V-DMC decoder 300 determines, based on the encoded mesh data, a base mesh (1602). V-DMC decoder 300 determines, based on the encoded mesh data, one or more displacement vectors (1604). V-DMC decoder 300 deforms the base mesh using the one or more displacement vectors (1606). For example, the base mesh may have a first set of vertices, and V-DMC decoder 300 may subdivide the base mesh to determine an additional set of vertices for the base mesh. To deform the base mesh, V-DMC decoder 300 may modify the locations of the additional set of vertices based on the one or more displacement vectors. V-DMC decoder 300 outputs a decoded mesh based on the deformed mesh (1608). V-DMC decoder 300 may, for example, output the decoded mesh for storage, transmission, or display.

Figure 17:
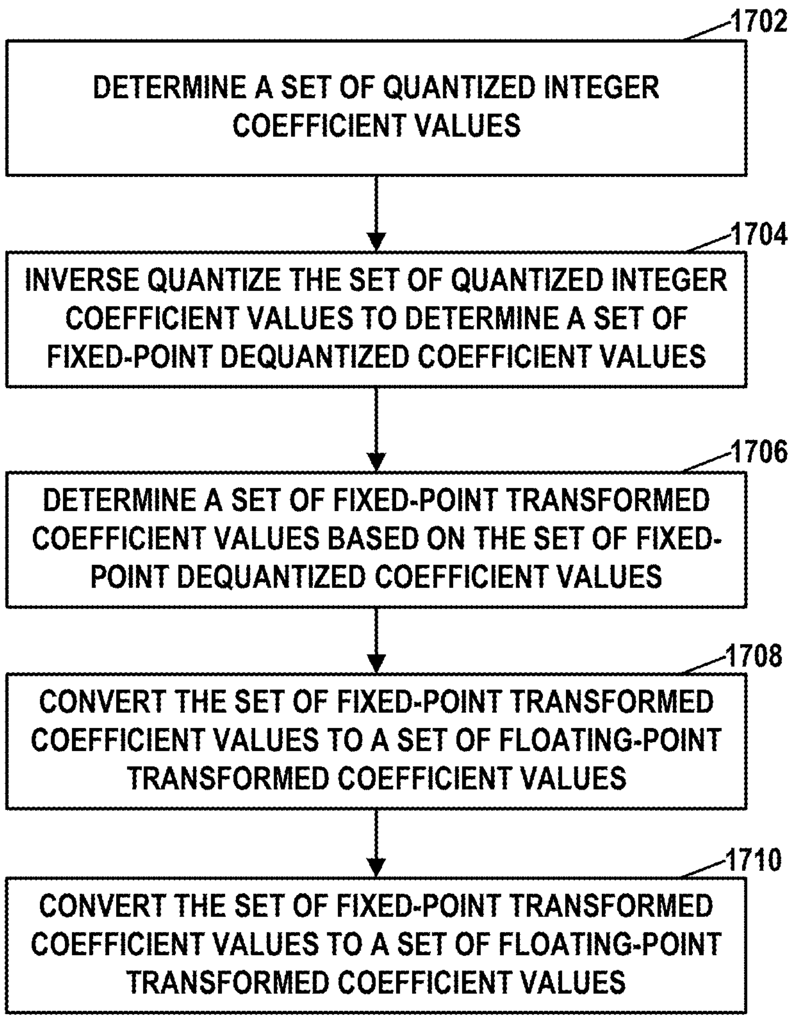
FIG. 17 is a flowchart illustrating an example process for decoding a compressed bitstream of mesh data.

FIG. 17 is a flowchart illustrating an example process for decoding a compressed bitstream of mesh data. Although described with respect to V-DMC decoder 300 (FIGS. 1 and 3), it should be understood that other devices may be configured to perform a process similar to that of FIG. 17.

In the example of FIG. 17, V-DMC decoder 300 determines a set of quantized integer coefficient values (1702). V-DMC decoder 300 inverse quantizes the set of quantized integer coefficient values to determine a set of fixed-point dequantized coefficient values (1704). To determine the set of fixed-point transformed coefficient values based on the set of fixed-point dequantized coefficient values, V-DMC decoder 300 may be configured to determine that the set of fixed-point transformed coefficient values are equal to the set of fixed-point dequantized coefficient values. In other examples, to determine the set of fixed-point transformed coefficient values based on the set of fixed-point dequantized coefficient values, V-DMC decoder 300 may be configured to add a set of reference values to the set of fixed-point dequantized coefficient values.

V-DMC decoder 300 determines a set of fixed-point transformed coefficient values based on the set of fixed-point dequantized coefficient values (1706). V-DMC decoder 300 converts the set of fixed-point transformed coefficient values to a set of floating-point transformed coefficient values (1708). V-DMC decoder 300 inverse transforms the set of floating-point transformed coefficient values to determine a set of reconstructed displacement vectors (1710). To inverse transform the set of floating-point transformed coefficient values to determine the set of reconstructed displacement vectors, V-DMC decoder 300 may be configured to apply an inverse wavelet transform to the set of floating-point transformed coefficient values.

V-DMC decoder 300 may store the set of fixed-point transformed coefficient values in a reference buffer. V-DMC decoder 300 may additionally determine a second set of quantized integer coefficient values; inverse quantize the second set of quantized integer coefficient values to determine a second set of fixed-point dequantized coefficient values; determine a second set of fixed-point transformed coefficient values based on the set of fixed-point dequantized coefficient values and the set of fixed-point transformed coefficient values stored in the reference buffer; convert the second set of fixed-point transformed coefficient values to a second set of floating-point transformed coefficient values; and inverse transform the second set of floating-point transformed coefficient values to determine a second set of reconstructed displacement vectors.

V-DMC decoder 300 may modify a base mesh based of reconstructed displacement vectors to determine a reconstructed deformed mesh and apply decoded attributes to the reconstructed deformed mesh to determine a reconstructed dynamic mesh sequence. V-DMC decoder 300 may output the reconstructed dynamic mesh sequence for display, storage, transmission, or other purposes.

The techniques of this disclosure may apply to both arithmetic coding and video-based coding architectures, or other coding methods such as variable length coding, neural network-based coding, etc. It is understood that the multiple coding approaches can be unified with the fixed-point inverse quantizer and reference buffer implementations.

The following numbered clauses illustrate one or more aspects of the devices and techniques described in this disclosure.

Clause 1. A device for decoding encoded dynamic mesh data, the device comprising: one or more memories; and one or more processors, implemented in circuitry and in communication with the one or more memories, configured to: determine a set of quantized integer coefficient values for displacement vectors of the encoded dynamic mesh data; inverse quantize the set of quantized integer coefficient values to determine a set of fixed-point dequantized coefficient values; determine a set of fixed-point transformed coefficient values based on the set of fixed-point dequantized coefficient values; convert the set of fixed-point transformed coefficient values to a set of floating-point transformed coefficient values; inverse transform the set of floating-point transformed coefficient values to determine a set of reconstructed displacement vectors; and determine a reconstructed deformed mesh based on the set of reconstructed displacement vectors.

Clause 2. The device of clause 1, wherein to determine the set of fixed-point transformed coefficient values based on the set of fixed-point dequantized coefficient values, the one or more processors are configured to determine that the set of fixed-point transformed coefficient values are equal to the set of fixed-point dequantized coefficient values.

Clause 3. The device of clause 1, wherein to determine the set of fixed-point transformed coefficient values based on the set of fixed-point dequantized coefficient values, the one or more processors are configured to add a set of reference values to the set of fixed-point dequantized coefficient values.

Clause 4. The device of any of clauses 1-3, wherein the one or more processors are further configured to: store the set of fixed-point transformed coefficient values in a reference buffer.

Clause 5. The device of clause 4, wherein the one or more processors are further configured to: determine a second set of quantized integer coefficient values; inverse quantize the second set of quantized integer coefficient values to determine a second set of fixed-point dequantized coefficient values; determine a second set of fixed-point transformed coefficient values based on the set of fixed-point dequantized coefficient values and the set of fixed-point transformed coefficient values stored in the reference buffer; convert the second set of fixed-point transformed coefficient values to a second set of floating-point transformed coefficient values; and inverse transform the second set of floating-point transformed coefficient values to determine a second set of reconstructed displacement vectors.

Clause 6. The device of any of clauses 1-5, wherein to inverse transform the set of floating-point transformed coefficient values to determine the set of reconstructed displacement vectors, the one or more processors are further configured to apply an inverse wavelet transform to the set of floating-point transformed coefficient values.

Clause 7. The device of any of clauses 1-6, wherein the one or more processors are further configured to modify a base mesh based of reconstructed displacement vectors to determine the reconstructed deformed mesh.

Clause 8. The device of clause 7, wherein the one or more processors are further configured to apply decoded attributes to the reconstructed deformed mesh to determine a reconstructed dynamic mesh sequence.

Clause 9. A method for decoding encoded dynamic mesh data, the method comprising: determining a set of quantized integer coefficient values for displacement vectors of the encoded dynamic mesh data; inverse quantizing the set of quantized integer coefficient values to determine a set of fixed-point dequantized coefficient values; determining a set of fixed-point transformed coefficient values based on the set of fixed-point dequantized coefficient values; converting the set of fixed-point transformed coefficient values to a set of floating-point transformed coefficient values; inverse transforming the set of floating-point transformed coefficient values to determine a set of reconstructed displacement vectors and determining a reconstructed deformed mesh based on the set of reconstructed displacement vectors.

Clause 10. The method of clause 9, wherein determining the set of fixed-point transformed coefficient values based on the set of fixed-point dequantized coefficient values comprises determining that the set of fixed-point transformed coefficient values are equal to the set of fixed-point dequantized coefficient values.

Clause 11. The method of clause 9, wherein determining the set of fixed-point transformed coefficient values based on the set of fixed-point dequantized coefficient values comprises adding a set of reference values to the set of fixed-point dequantized coefficient values.

Clause 12. The method of any of clauses 9-11, further comprising: storing the set of fixed-point transformed coefficient values in a reference buffer.

Clause 13. The method of clause 12, further comprising: determining a second set of quantized integer coefficient values; inverse quantizing the second set of quantized integer coefficient values to determine a second set of fixed-point dequantized coefficient values; determining a second set of fixed-point transformed coefficient values based on the set of fixed-point dequantized coefficient values and the set of fixed-point transformed coefficient values stored in the reference buffer; converting the second set of fixed-point transformed coefficient values to a second set of floating-point transformed coefficient values; and inverse transforming the second set of floating-point transformed coefficient values to determine a second set of reconstructed displacement vectors.

Clause 14. A computer-readable storage medium storing instructions that when executed by one or more processors cause the one or more processors to: determine a set of quantized integer coefficient values for displacement vectors of the encoded dynamic mesh data; inverse quantize the set of quantized integer coefficient values to determine a set of fixed-point dequantized coefficient values; determine a set of fixed-point transformed coefficient values based on the set of fixed-point dequantized coefficient values; convert the set of fixed-point transformed coefficient values to a set of floating-point transformed coefficient values; inverse transform the set of floating-point transformed coefficient values to determine a set of reconstructed displacement vectors; and determine a reconstructed deformed mesh based on the set of reconstructed displacement vectors.

Clause 15. A device for encoding dynamic mesh data, the device comprising: one or more memories; and one or more processors, implemented in circuitry and in communication with the one or more memories, configured to: determine a set of quantized integer coefficient values; inverse quantize the set of quantized integer coefficient values to determine a set of fixed-point dequantized coefficient values; determine a set of fixed-point transformed coefficient values based on the set of fixed-point dequantized coefficient values; convert the set of fixed-point transformed coefficient values to a set of floating-point transformed coefficient values; and inverse transform the set of floating-point transformed coefficient values to determine a set of reconstructed displacement vectors.

Clause 16. The device of clause 15, wherein to determine the set of fixed-point transformed coefficient values based on the set of fixed-point dequantized coefficient values, the one or more processors are configured to determine that the set of fixed-point transformed coefficient values are equal to the set of fixed-point dequantized coefficient values.

Clause 17. The device of clause 15, wherein to determine the set of fixed-point transformed coefficient values based on the set of fixed-point dequantized coefficient values, the one or more processors are configured to add a set of reference values to the set of fixed-point dequantized coefficient values.

Clause 18. The device of any of clauses 15-17, wherein the one or more processors are further configured to: store the set of fixed-point transformed coefficient values in a reference buffer.

Clause 19. The device of clause 18, wherein the one or more processors are further configured to: determine a second set of quantized integer coefficient values; inverse quantize the second set of quantized integer coefficient values to determine a second set of fixed-point dequantized coefficient values; determine a second set of fixed-point transformed coefficient values based on the set of fixed-point dequantized coefficient values and the set of fixed-point transformed coefficient values stored in the reference buffer; convert the second set of fixed-point transformed coefficient values to a second set of floating-point transformed coefficient values; and inverse transform the second set of floating-point transformed coefficient values to determine a second set of reconstructed displacement vectors.

Clause 20. The device of any of clauses 15-19, wherein to inverse transform the set of floating-point transformed coefficient values to determine the set of reconstructed displacement vectors, the one or more processors are further configured to apply an inverse wavelet transform to the set of floating-point transformed coefficient values.

Clause 21. A device for decoding encoded dynamic mesh data, the device comprising: one or more memories; and one or more processors, implemented in circuitry and in communication with the one or more memories, configured to: perform displacement wavelet coefficient inter prediction with fixed-point inverse quantization to decoded a displacement vector.

Clause 22. The device of clause 21, wherein the one or more processors are further configured to modify a base mesh based on the displacement vector to determine a reconstructed deformed mesh.

Clause 23. The device of clause 22, wherein the one or more processors are further configured to apply decoded attributes to the reconstructed deformed mesh to determine a reconstructed dynamic mesh sequence.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding encoded dynamic mesh data, the device comprising:

one or more memories; and one or more processors, implemented in circuitry and in communication with the one or more memories, configured to:

determine a set of quantized integer coefficient values for displacement vectors of the encoded dynamic mesh data;

inverse quantize the set of quantized integer coefficient values to determine a set of fixed-point dequantized coefficient values;

determine a set of fixed-point transformed coefficient values based on the set of fixed-point dequantized coefficient values;

convert the set of fixed-point transformed coefficient values to a set of floating-point transformed coefficient values;

inverse transform the set of floating-point transformed coefficient values to determine a set of reconstructed displacement vectors; and determine a reconstructed deformed mesh based on the set of reconstructed displacement vectors.

2. The device of claim 1, wherein to determine the set of fixed-point transformed coefficient values based on the set of fixed-point dequantized coefficient values, the one or more processors are configured to determine that the set of fixed-point transformed coefficient values are equal to the set of fixed-point dequantized coefficient values.

3. The device of claim 1, wherein to determine the set of fixed-point transformed coefficient values based on the set of fixed-point dequantized coefficient values, the one or more processors are configured to add a set of reference values to the set of fixed-point dequantized coefficient values.

4. The device of claim 1, wherein the one or more processors are further configured to:

store the set of fixed-point transformed coefficient values in a reference buffer.

5. The device of claim 4, wherein the one or more processors are further configured to:

determine a second set of quantized integer coefficient values;

inverse quantize the second set of quantized integer coefficient values to determine a second set of fixed-point dequantized coefficient values;

determine a second set of fixed-point transformed coefficient values based on the set of fixed-point dequantized coefficient values and the set of fixed-point transformed coefficient values stored in the reference buffer;

convert the second set of fixed-point transformed coefficient values to a second set of floating-point transformed coefficient values; and inverse transform the second set of floating-point transformed coefficient values to determine a second set of reconstructed displacement vectors.

6. The device of claim 1, wherein to inverse transform the set of floating-point transformed coefficient values to determine the set of reconstructed displacement vectors, the one or more processors are further configured to apply an inverse wavelet transform to the set of floating-point transformed coefficient values.

7. The device of claim 1, wherein the one or more processors are further configured to modify a base mesh based of reconstructed displacement vectors to determine the reconstructed deformed mesh.

8. The device of claim 7, wherein the one or more processors are further configured to apply decoded attributes to the reconstructed deformed mesh to determine a reconstructed dynamic mesh sequence.

9. A method for decoding encoded dynamic mesh data, the method comprising:

determining a set of quantized integer coefficient values for displacement vectors of the encoded dynamic mesh data;

inverse quantizing the set of quantized integer coefficient values to determine a set of fixed-point dequantized coefficient values;

determining a set of fixed-point transformed coefficient values based on the set of fixed-point dequantized coefficient values;

converting the set of fixed-point transformed coefficient values to a set of floating-point transformed coefficient values;

inverse transforming the set of floating-point transformed coefficient values to determine a set of reconstructed displacement vectors and determining a reconstructed deformed mesh based on the set of reconstructed displacement vectors.

10. The method of claim 9, wherein determining the set of fixed-point transformed coefficient values based on the set of fixed-point dequantized coefficient values comprises determining that the set of fixed-point transformed coefficient values are equal to the set of fixed-point dequantized coefficient values.

11. The method of claim 9, wherein determining the set of fixed-point transformed coefficient values based on the set of fixed-point dequantized coefficient values comprises adding a set of reference values to the set of fixed-point dequantized coefficient values.

12. The method of claim 9, further comprising:

storing the set of fixed-point transformed coefficient values in a reference buffer.

13. The method of claim 12, further comprising:

determining a second set of quantized integer coefficient values;

inverse quantizing the second set of quantized integer coefficient values to determine a second set of fixed-point dequantized coefficient values;

determining a second set of fixed-point transformed coefficient values based on the set of fixed-point dequantized coefficient values and the set of fixed-point transformed coefficient values stored in the reference buffer;

converting the second set of fixed-point transformed coefficient values to a second set of floating-point transformed coefficient values; and inverse transforming the second set of floating-point transformed coefficient values to determine a second set of reconstructed displacement vectors.

14. A non-transitory computer-readable storage medium storing instructions that when executed by one or more processors cause the one or more processors to:

determine a set of quantized integer coefficient values for displacement vectors of the encoded dynamic mesh data;

inverse quantize the set of quantized integer coefficient values to determine a set of fixed-point dequantized coefficient values;

determine a set of fixed-point transformed coefficient values based on the set of fixed-point dequantized coefficient values;

convert the set of fixed-point transformed coefficient values to a set of floating-point transformed coefficient values;

inverse transform the set of floating-point transformed coefficient values to determine a set of reconstructed displacement vectors; and determine a reconstructed deformed mesh based on the set of reconstructed displacement vectors.

15. A device for encoding dynamic mesh data, the device comprising:

one or more memories; and one or more processors, implemented in circuitry and in communication with the one or more memories, configured to:

determine a set of quantized integer coefficient values;

inverse quantize the set of quantized integer coefficient values to determine a set of fixed-point dequantized coefficient values;

determine a set of fixed-point transformed coefficient values based on the set of fixed-point dequantized coefficient values;

convert the set of fixed-point transformed coefficient values to a set of floating-point transformed coefficient values; and inverse transform the set of floating-point transformed coefficient values to determine a set of reconstructed displacement vectors.

16. The device of claim 15, wherein to determine the set of fixed-point transformed coefficient values based on the set of fixed-point dequantized coefficient values, the one or more processors are configured to determine that the set of fixed-point transformed coefficient values are equal to the set of fixed-point dequantized coefficient values.

17. The device of claim 15, wherein to determine the set of fixed-point transformed coefficient values based on the set of fixed-point dequantized coefficient values, the one or more processors are configured to add a set of reference values to the set of fixed-point dequantized coefficient values.

18. The device of claim 15, wherein the one or more processors are further configured to:

store the set of fixed-point transformed coefficient values in a reference buffer.

19. The device of claim 18, wherein the one or more processors are further configured to:

determine a second set of quantized integer coefficient values;

inverse quantize the second set of quantized integer coefficient values to determine a second set of fixed-point dequantized coefficient values;

determine a second set of fixed-point transformed coefficient values based on the set of fixed-point dequantized coefficient values and the set of fixed-point transformed coefficient values stored in the reference buffer;

convert the second set of fixed-point transformed coefficient values to a second set of floating-point transformed coefficient values; and inverse transform the second set of floating-point transformed coefficient values to determine a second set of reconstructed displacement vectors.

20. The device of claim 15, wherein to inverse transform the set of floating-point transformed coefficient values to determine the set of reconstructed displacement vectors, the one or more processors are further configured to apply an inverse wavelet transform to the set of floating-point transformed coefficient values.

* * * * *